United States Patent [19]
Noguchi

[11] Patent Number: 5,810,455
[45] Date of Patent: *Sep. 22, 1998

[54] VEHICLE BRAKING SYSTEM HAVING DEVICE FOR DIAGNOSING PRESSURE REDUCING VALVE DEVICE BETWEEN PUMP AND FRONT WHEEL BRAKE CYLINDER

[75] Inventor: Noboru Noguchi, Nagoya, Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 533,228

[22] Filed: Sep. 25, 1995

[30] Foreign Application Priority Data

Oct. 3, 1994 [JP] Japan ................................ 6-238947
Oct. 3, 1994 [JP] Japan ................................ 6-238950

[51] Int. Cl.$^6$ .................................... B60T 13/00
[52] U.S. Cl. .............. 303/9.62; 303/113.5; 303/186; 303/116.1
[58] Field of Search ............... 303/9.62, 113.5, 303/186, 187, 188, 116.1, 119.1, 155, 122, 122.09, 122.1

[56] References Cited

U.S. PATENT DOCUMENTS

| | | |
|---|---|---|
| 4,560,210 | 12/1985 | Tani et al. . |
| 4,735,279 | 4/1988 | Sato .................................. 303/113.5 X |
| 5,178,442 | 1/1993 | Toda et al. . |
| 5,320,423 | 6/1994 | Hashida .............................. 303/113.5 |
| 5,393,131 | 2/1995 | Nomura et al. .................... 303/9.62 X |

FOREIGN PATENT DOCUMENTS

| | | |
|---|---|---|
| A-19504295 | 8/1995 | European Pat. Off. . |
| 54-49472 | 9/1977 | Japan .................................... 303/9.62 |

*Primary Examiner*—Peter M. Poon
*Attorney, Agent, or Firm*—Kenyon & Kenyon

[57] ABSTRACT

A braking system for a motor vehicle, having a pressure source, a front wheel brake cylinder and a rear wheel brake cylinder which are connected to the pressure source and produce respective front and rear braking forces for braking respective front and rear wheels of the vehicle, and a pressure reducing valve device for reducing a pressure of the pressure source so that the reduced pressure is applied to the front wheel brake cylinder, wherein a diagnosing device is provided for diagnosing the pressure reducing valve device for abnormality. The diagnosing device may be adapted to diagnose the valve device on the basis of the number of operations to reduce the rear wheel brake cylinder pressure, a pressure difference across the valve device or a change of electrical continuity between electrically conductive valve member and valve seat of the valve device.

14 Claims, 22 Drawing Sheets

FIG. 11

{ CONDITIONS FOR DETERMINING ABNORMALITY OF VALVE DEVICE 160

AND
1) During anti-lock pressure control of braking system
2) During running on good road surface
3) During light braking of vehicle
4) During straight vehicle running
5) During vehicle running on even friction-coefficient road surface
6) Determination that number ratio $\gamma$ ($= CR / CF$) $\leq \gamma o$ has been made consecutively predetermined number of times F for either one of the two sub-systems

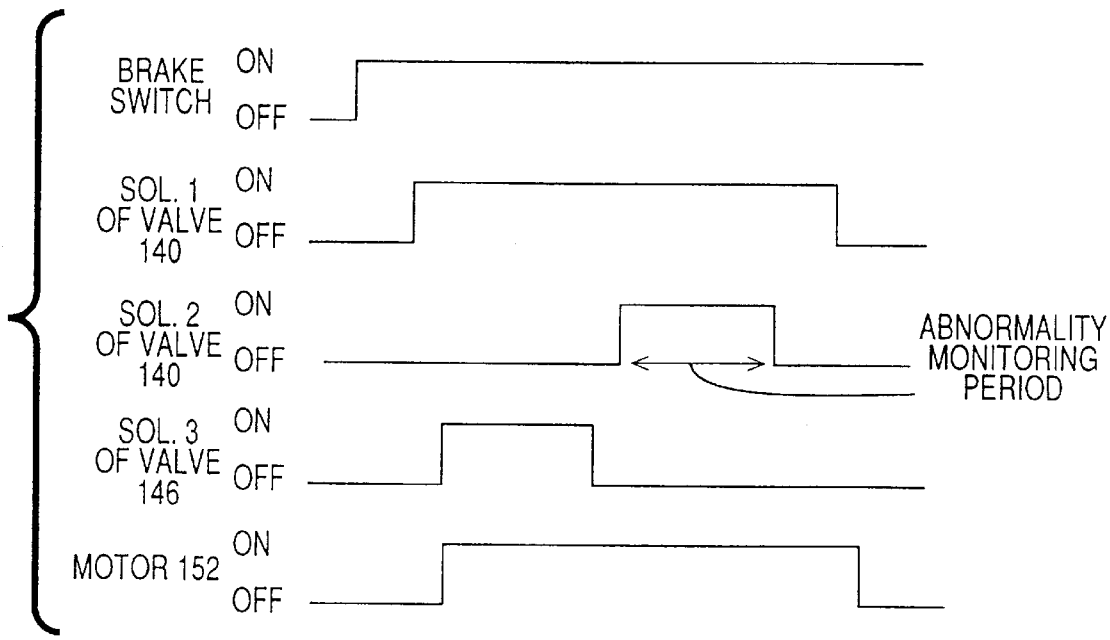
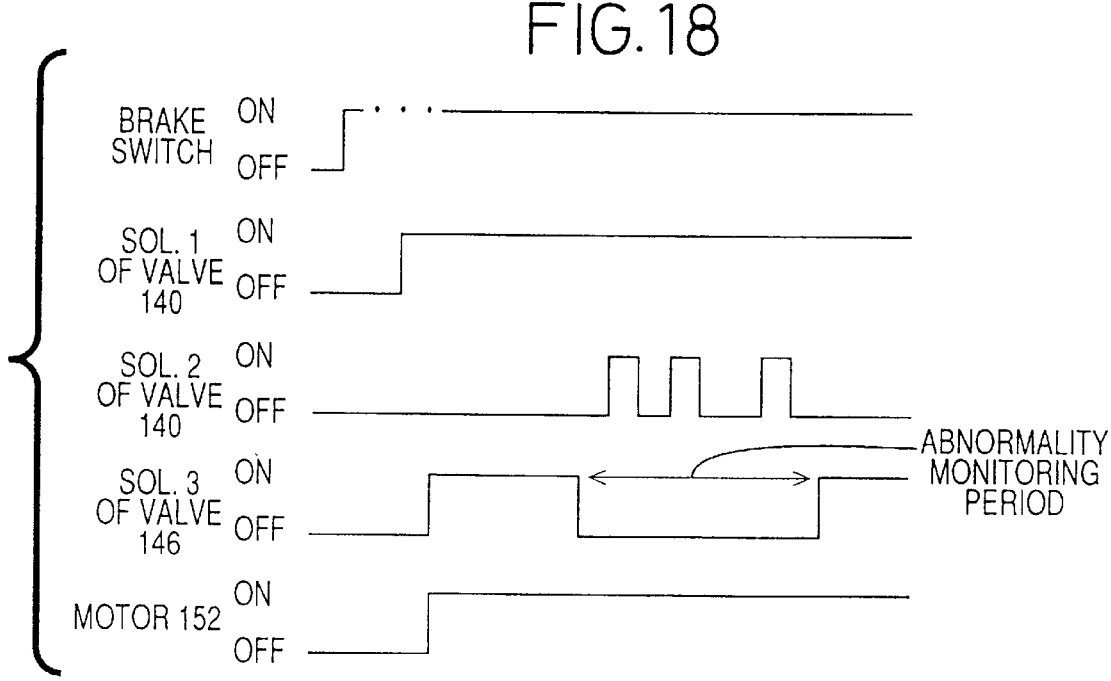

VEHICLE BRAKING SYSTEM HAVING DEVICE FOR DIAGNOSING PRESSURE REDUCING VALVE DEVICE BETWEEN PUMP AND FRONT WHEEL BRAKE CYLINDER

BACKGROUND OF THE INVENTION

1. Field of the Invention

The present invention relates in general to a braking system of a motor vehicle, which may be a diagonal or X-crossing type, which is constructed for optimizing the distribution of braking forces of front and rear wheels of the vehicle, and more particularly to techniques for improving operating reliability of such braking system.

2. Discussion of the Related Art

There is known a motor vehicle braking system wherein a proportioning valve is provided so that the braking pressure applied to a rear wheel brake cylinder is lower than that applied to a front wheel brake cylinder when the hydraulic pressure generated by a pressure source exceeds a predetermined threshold level. Even where the proportioning valve is a load-sensing type, such known braking system suffers from a drawback that the braking force which is generated by the rear wheel brake cylinder cannot be made sufficiently high without causing locking of the rear wheel of the vehicle, when the front and rear braking forces generated by the front and rear wheel brake cylinders are relatively small, namely, when the front and rear braking forces are considerably close to zero, during running of the vehicle in a loaded state. For example, this drawback is likely to occur before the hydraulic pressure generated by the pressure source reaches the above-indicated threshold level of the load-sensing proportioning valve, that is, immediately after activation of the braking system by operation of a brake operating member (e.g., brake pedal), during running of the loaded vehicle on a road surface whose friction coefficient is relatively low. The rear braking force cannot be sufficiently increased because a line representing actual distribution of the front and rear braking forces relatively largely deviates from a curve representing an ideal distribution in a direction that causes the rear braking force to be lower than the front braking force. This deviation of the actual distribution line from the ideal distribution curve arises since the actual distribution line is held constant irrespective of whether the vehicle is loaded (with passengers or cargo) or not, at least when the front and rear braking forces are relatively small, and since the gradient of the actual distribution line is determined so as to prevent locking of the rear wheels prior to locking of the front wheels when the front and rear braking forces are relatively small. To avoid the drawback indicated above, it is necessary to provide two or more actual distribution lines which are selectively used at least when the braking forces are relatively small.

In the light of the above drawback, the assignee of the present application developed an anti-lock braking system (not known to the public at the time the present invention was made), which is a diagonal or X-crossing type braking system for a four-wheel motor vehicle, having two pressure application sub-systems which are connected to respective two mutually independent pressurizing chambers of a master cylinder, each of the pressure application sub-systems including (a) a front brake cylinder passage connecting a corresponding one of the two pressurizing chambers of the master cylinder and a front wheel brake cylinder of a front brake, (b) a rear brake cylinder passage connecting the front brake cylinder passage and a rear wheel brake cylinder of a rear brake, (c) a first shut-off valve which is disposed in a portion of the front brake cylinder passage between the master cylinder and a point of connection of the front and rear brake cylinder passages and which is normally open and is closed during an anti-lock pressure control operation of the front and rear wheel brake cylinders, (d) a normally-open second shut-off valve disposed in the rear brake cylinder passage, (e) a reservoir passage connected at one of opposite ends thereof to a portion of the rear brake cylinder passage between said second shut-off valve and the rear wheel brake cylinder, (f) a normally-closed third shut-off valve disposed in the reservoir passage, (g) a reservoir connected to the other end of the reservoir passage, (h) a pump passage connected at one of opposite ends thereof to the reservoir and at the other end thereof to a portion of the rear brake cylinder passage between the second shut-off valve and the above-indicated point of connection or to a portion of the front brake cylinder passage between the first shut-off valve and the front wheel brake cylinder, (i) a pump disposed in the pump passage for pressurizing a working fluid received from the reservoir and delivering the pressurized fluid to a portion of each pressure application sub-system, (j) a controller for controlling the first, second and third shut-off valves for effecting the anti-lock pressure control operation of the front and rear wheel brake cylinders, and (k) a pressure reducing valve device disposed between the pump and the front wheel brake cylinder, for reducing a pressure of the fluid pressurized by the pump so that the reduced pressure is applied to the front wheel brake cylinder, in order to optimize the distribution of wheel braking forces generated by the front and rear brakes.

The pressure reducing valve device may include a check valve which inhibits a flow of the fluid in a direction from the front wheel brake cylinder toward the pump, but permits a flow of the brake fluid in a direction from the pump toward the front wheel brake cylinder when the pressure of the fluid delivered by the pump is higher than the pressure in the front wheel brake cylinder by more than a predetermined valve opening pressure difference. In operation of the check valve, the pressure to be applied to the front wheel brake cylinder is reduced with respect to the pressure of the fluid delivered by the pump, by an amount corresponding to the predetermined valve opening pressure difference of the check valve.

In this anti-lock braking system, the pump serves as the pressure source during the anti-lock pressure control operation, and the pressure reducing valve device functions to reduce the pressure of the fluid pressurized by the pump, for applying the reduced pressure to the front wheel brake cylinder during the anti-lock pressure control operation, so that the rear braking pressure generated by the rear wheel brake cylinder is increased so as to be higher in the anti-lock braking mode than in the normal braking mode in which the master cylinder serves as the pressure source and the pressure reducing valve device is not in operation. Thus, the rear braking force is made larger in the anti-lock pressure control operation than in the normal braking operation.

In the anti-lock braking system developed by the assignee of this application, the pressure reducing valve device plays an important role of optimizing the distribution of the front and rear braking forces. Therefore, it is desirable that the pressure reducing valve device be completely free from any abnormality or defect. In the case where the valve device uses a check valve as a major component, however, foreign matters may be caught between a valve member and a valve seat of the check valve, disabling the check valve to be closed. This abnormality prevents the formal functioning of the check valve to reduce the pressure in the front wheel brake cylinder.

It is desirable to detect such abnormality as soon as possible, and inform the operator of the motor vehicle of the presence or occurrence of the abnormality so that the operator may take an appropriate remedy to remove the abnormality. If the vehicle operator was not informed of the presence of such abnormality of the pressure reducing valve device, the operator would manipulate the anti-lock braking system as if the system was normal, and eventually doubt about the operating reliability of the braking system contrary to the operator's belief that the system is reliable.

For improving the operating reliability of the braking system, it is considered effective to minimize the functional deterioration or defect of the pressure reducing valve device in the event of an occurrence of such functional deterioration.

SUMMARY OF THE INVENTION

It is therefore a first object of the present invention to provide a braking system wherein a pressure reducing valve device is provided to optimize the distribution of the front and rear braking forces of a motor vehicle, which braking system is capable of detecting abnormality of the pressure reducing valve device to thereby improve the operating reliability of the braking system.

It is a second object of this invention to provide a braking system which has a pressure reducing valve device and which is adapted to minimize functional deterioration of the valve device in the event of occurrence of such functional deterioration.

The first object may be achieved according to one aspect of the present invention, which provides a braking LO system for a motor vehicle, comprising: a pressure source; a front wheel brake cylinder and a rear wheel brake cylinder which are connected to the pressure source and produce respective front and rear braking forces for braking respective front and rear wheels of the vehicle; a pressure reducing valve device for reducing a pressure of the pressure source so that the reduced pressure is applied to the front wheel brake cylinder, the pressure of the pressure source being applied to the rear wheel brake cylinder without reduction by the pressure reducing valve device; and diagnosing means for detecting abnormality of the pressure reducing valve device.

In the present braking system described above, the pressure reducing valve device is diagnosed for abnormality by the diagnosing means. Therefore, the present braking system may be adapted, for example, to activate suitable alarming means to inform the vehicle operator of abnormality of the valve device as soon as the abnormality is detected by the diagnosing means. Accordingly, this arrangement improves the operating reliability of the braking system in which the pressure reducing valve device is provided to optimize the distribution of the front and rear braking forces produced by the respective front and rear wheel brake cylinders.

The pressure source may be connected to the front and rear wheel brake cylinders through respective two fluid passages, which extend from the pressure source independently of each other. Alternatively, a single fluid passage extends from the pressure source and is split into two branch lines which are connected at their ends to the respective front and rear wheel brake cylinders. In the former arrangement, the pressure reducing valve device is provided in one of the two fluid passages which connect the pressure source and the front wheel brake cylinder. In the latter arrangement, the pressure reducing valve device is provided in one of the two branch lines which is connected to the front wheel brake cylinder.

In a first preferred form of the present braking system, the pressure reducing valve device includes a check valve which permits a flow of a brake fluid in a first direction from the pressure source toward the front wheel brake cylinder when a pressure of the pressure source is higher than a pressure in the front wheel brake cylinder by more than a predetermined valve opening pressure difference. The check valve inhibits a flow of the brake fluid in a second direction opposite to the first direction. In this case, the check valve is diagnosed by the diagnosing means.

In a second preferred form of the present braking system, the diagnosing means includes pressure difference detecting means for detecting a pressure difference across the pressure reducing valve device which pressure difference exists when the pressure reducing valve device is normal, and further includes determining means for determining the presence of abnormality of the pressure reducing valve device if the pressure difference detecting means does not detect the pressure difference.

The diagnosing means in the above second preferred form of the invention is arranged based on a fact that the nominal pressure difference which is normally present across the pressure reducing valve device is not present if the valve device is kept open due to the presence of a foreign matter caught between a valve member and a valve seat of the valve device. That is, the diagnosing means determines that the valve device is abnormal if the nominal pressure difference does not exist across the valve device. Thus, the diagnosis of the valve device is effected according to a known relationship between the presence or absence of abnormality of the valve device and the presence or absence of the nominal pressure difference across the valve device.

However, the presence of a foreign matter caught in the valve device is not the only cause for the absence of the nominal pressure difference across the valve device. The pressure difference does not exist across the valve device for other reasons. For instance, the pressure difference does not exist if the pressure source fails to normally function to generate a nominal pressure, or any check valve (irrespective of whether it is provided in the valve device or not) in the braking system fails to normally function. Consequently, the present braking system according to the second preferred form of the invention is also capable of detecting abnormality of the valve device which arises from not only abnormality of the valve device per se, but also abnormality of components not directly associated with the valve device. In this context, the "abnormality" means any abnormal condition in which the nominal pressure difference does not exist across the valve device.

In one advantageous arrangement of the first preferred form of the invention indicated above, the check valve includes a valve member and a valve seat which cooperate with each other to inhibit the flow of the brake fluid in the second direction and each of which is made of an electrically conductive material, and the diagnosing means includes an electrical change detecting portion for detecting a chronological change of electric continuity between the valve member and the valve seat which electrical change exists when the pressure reducing valve device is normal. In this arrangement, the diagnosing means further includes determining means for determining the presence of abnormality of the pressure reducing valve device if the electrical change detecting portion does not detect the chronological change of the electric continuity.

The diagnosing means in the above advantageous arrangement of the invention is arranged based on the fact that there arises a nominal chronological change in the electric continuity between the valve member and valve seat of the pressure reducing valve device if the valve device is normal, but such a change does not occur if the valve device is kept open due to the presence of a foreign matter caught between the valve member and the valve seat. That is, the diagnosing means determines that the valve device is abnormal if the nominal chronological change of electric continuity of the valve device is not detected by the electrical change detecting portion. Thus, the diagnosis of the valve device is effected according to a known relationship between the presence or absence of abnormality of the valve device and the presence or absence of the nominal chronological change of electric continuity of the valve device. In this respect, it is noted that the valve member and the valve seat are both made of an electrically conductive material, so that these valve member and valve seat of the valve device are utilized as part of the diagnosing means. This arrangement makes it possible to reduce the required number of components exclusively used for the diagnosing means, and thereby minimize an increase in the cost of manufacture of the diagnosing means.

In a third preferred form of the first aspect of the invention described above, the braking system is an X-crossing type braking system for a four-wheel motor vehicle including the front and rear wheels, which braking system has two pressure application sub-systems which are connected to respective two mutually independent pressurizing chambers of a master cylinder. Each of the two pressure application sub-systems includes (a) a front brake cylinder passage connecting a corresponding one of the two pressurizing chambers of the master cylinder and the front wheel brake cylinder, (b) a rear brake cylinder passage connecting the front brake cylinder passage and the rear wheel brake cylinder, (c) a first shut-off valve which is disposed in a portion of the front brake cylinder passage between the master cylinder and a point of connection of the front and rear brake cylinder passages, the first shut-off valve being open and closed respectively in a normal braking mode and an anti-lock braking mode of the front and rear wheel brake cylinders, (d) a normally-open second shut-off valve disposed in the rear brake cylinder passage, (e) a reservoir passage connected at one of opposite ends thereof to a portion of the rear brake cylinder passage between the second shut-off valve and the rear wheel brake cylinder, (f) a normally-closed third shut-off valve disposed in the reservoir passage, (g) a reservoir connected to the other end of the reservoir passage, (h) a pump passage connected at one of opposite ends thereof to the reservoir and at the other end thereof to at least one of a portion of the rear brake cylinder passage between the second shut-off valve and the point of connection and a portion of the front brake cylinder passage between the first shut-off valve and the front wheel brake cylinder, (i) a pump disposed in the pump passage for pressurizing a brake fluid received from the reservoir and delivering the pressurized brake fluid to a portion of each pressure application sub-system, and (j) a controller for controlling the first, second and third shut-off valves for controlling pressures in the front and rear wheel brake cylinders in the anti-lock braking mode. In the present third preferred form of the invention, the pressure reducing valve device is disposed between the pump and the front wheel brake cylinder for reducing a pressure of the pressurized brake fluid so that the reduced pressure of the pressurized brake fluid is applied to the front wheel brake cylinder.

In one advantageous arrangement of the above third preferred form of the invention, the pump passage connects the reservoir and a portion of the rear brake cylinder passage between the second shut-off valve and the point of connection of the front and rear brake cylinder passages, and the pressure reducing valve device is disposed in a portion of the rear brake cylinder passage between the point of connection of the front and rear brake cylinder passages and a point of connection between the rear brake cylinder passage and the pump passage. The pressure reducing valve device includes a first check valve which permits a flow of a brake fluid in a first direction from the pump toward the front wheel brake cylinder when a pressure of the pressurized brake fluid delivered from the pump is higher than a pressure in the front wheel brake cylinder by more than a predetermined valve opening pressure difference. The first check valve inhibits a flow of the brake fluid in a second direction opposite to the first direction. The pressure reducing valve device further includes a second check valve which is disposed in parallel connection with the first check valve and which permits a flow of the brake fluid in said first direction from the front wheel brake cylinder toward the pump such that a pressure difference across the second check valve is substantially zero. The second check valve inhibits a flow of the brake fluid in said first direction.

In the above advantageous arrangement, at least a part of the portion of the rear brake cylinder passage between the point of connection of the front and rear brake cylinder passages and the point of connection between the rear brake cylinder passage and the pump passage may consist of an inner passage and an outer passage which are formed concentrically with and independently of each other. In this instance, the first check valve is disposed in one of the inner and outer passages, while the second check valve is disposed in the other of the inner and outer passages.

In a fourth preferred form of the first aspect of the invention, the braking system is an X-crossing type braking system for a four-wheel motor vehicle including the front and rear wheels, which braking system has two pressure application sub-systems which are connected to respective two mutually independent pressurizing chambers of a master cylinder. Each of the two pressure application sub-systems includes (a) a front brake cylinder passage connecting a corresponding one of the two pressurizing chambers of the master cylinder and the front wheel brake cylinder, (b) a rear brake cylinder passage connecting the front brake cylinder passage and the rear wheel brake cylinder, (c) a first shut-off valve which is disposed in a portion of the front brake cylinder passage between the master cylinder and a point of connection of the front and rear brake cylinder passages, the first shut-off valve being open and closed respectively in a normal braking mode and an anti-lock braking mode of the front and rear wheel brake cylinders, (d) a normally-open second shut-off valve disposed in the rear brake cylinder passage, (e) a reservoir passage connected at one of opposite ends thereof to a portion of the rear brake cylinder passage between the second shut-off valve and the rear wheel brake cylinder, (f) a normally-closed third shut-off valve disposed in the reservoir passage, (g) a reservoir connected to the other end of the reservoir passage, (h) a pump passage connected at one of opposite ends thereof to the reservoir and at the other end thereof to at least one of a portion of the rear brake cylinder passage between the second shut-off valve and the point of connection and a portion of the front brake cylinder passage between the first shut-off valve and the front wheel brake cylinder, (i) a pump disposed in the pump passage for pressurizing a brake fluid received from the reservoir and delivering the pressurized brake fluid to a portion of each pressure application sub-system, and (j) a controller for controlling the first, second and third shut-off valves for controlling pressures in the front and rear wheel brake cylinders in the anti-lock braking mode, and wherein the pressure reducing valve device is disposed between the pump and the front wheel brake cylinder for reducing a pressure of the pressurized brake fluid so that the reduced pressure of the pressurized brake fluid is applied to the front wheel brake cylinder. In this fourth preferred form of the invention, the diagnosing means determines, for at least one of the two pressure application sub-systems, the presence or absence of abnormality of the pressure reducing valve device, on the basis of the number of operations to reduce the pressure in the rear wheel brake cylinder in the anti-lock braking mode.

The braking system according to the present fourth preferred form is available with a reduced cost since the diagnosing means may be constituted by an electronic controller, without an additional hardware device such as an abnormality detecting switch associated with the pressure reducing valve device.

Regarding the above fourth preferred form of the invention, it is noted that the pressure in the rear wheel brake cylinder tends to be lowered when the pressure reducing valve device is abnormal or defective, and therefore the number of operations to reduce the pressure in the rear wheel brake cylinder in the anti-lock braking mode tends to be reduced as compared with that when the valve device is normal. Accordingly, it is possible to estimate whether the valve device is normal or abnormal, by monitoring the number of such operations to reduce the rear wheel brake cylinder pressure in the anti-lock braking mode.

The present fourth preferred form of the invention was made in view of the above finding. Namely, the diagnosing means determines the presence or absence of abnormality of the pressure reducing valve device, on the basis of the number of the operations to reduce the rear wheel brake cylinder pressure in the anti-lock braking mode. For instance, the diagnosing means determines the presence of abnormality of the valve device if the above-indicated number is smaller than a predetermined nominal value.

It is also noted that the relationship between the pressures in the front and rear wheel brake cylinders deviates from the nominal or normal one, if the pressure reducing valve devices becomes abnormal or defective. Accordingly, the valve device may be diagnosed for abnormality, by monitoring a change in the relationship between the front and rear wheel brake cylinder pressures.

In view of the above finding, the above fourth preferred form of the braking system is constructed according to a first advantageous arrangement wherein the diagnosing means in each pressure application sub-system determines the presence of an abnormal state of the braking system if a predetermined abnormality condition is satisfied. The abnormal state is defined as a state in which both of the pressure reducing valve devices in the two pressure application sub-systems are not normally functioning. The predetermined abnormality condition consists of at least one of a first and a second condition. The first condition is a condition that a ratio of the number of the operations to reduce the pressure in the rear wheel brake cylinder in the anti-lock braking mode to the number of operations to reduce the pressure in the front wheel brake cylinder in the anti-lock braking mode is equal to a predetermined reference value or smaller, and the second condition is a condition that a difference obtained by subtracting the number of the operations to reduce the pressure in the front wheel brake cylinder from the number of the operations to reduce the pressure in the rear wheel brake cylinder is equal to a predetermined reference value or smaller.

In some anti-lock braking system, a solenoid-operated valve device for controlling the pressures in the front and rear wheel brake cylinder pressures in the anti-lock braking mode is not capable of lowering the pressure in the front wheel brake cylinder without lowering the pressure in the rear wheel brake cylinder in the event of a locking tendency of the front wheel in some situation. In this case, the pressure in the rear wheel brake cylinder is also lowered, and the above-indicated number of the pressure reducing operations to reduce the rear wheel brake cylinder pressure may include the number of pressure reducing operations which are performed-in such situation for the rear wheel brake cylinder, or may consist of only the number of pressure reducing operations which are performed for the rear wheel brake cylinder to remove a locking tendency of the rear wheel.

In the above first advantageous arrangement of the fourth preferred form of the braking system according to the first aspect of the invention, the diagnosing means may be adapted to determine the presence of the abnormal state of the braking system if the predetermined abnormality condition is satisfied consecutively at least a predetermined number of times in either one of the two pressure application sub-systems. That is, if the pressure reducing valve device is found abnormal in either one of the two pressure application sub-systems, the diagnosing means determines the presence of abnormality of the anti-lock braking system as a whole, since the abnormal pressure reducing valve device in either of the sub-systems prevents the braking system from normally operating.

Alternatively the diagnosing means may be adapted to determine the presence of the abnormal state of the braking system if the predetermined abnormality condition is satisfied consecutively at least a predetermined number of times in both of the two pressure application sub-systems. Needless to say, the presence of abnormality of the valve device in both sub-systems prevents normal functioning of the anti-lock braking system, and surely indicates abnormality of the braking system.

Further alternatively, the diagnosing means may be preferably adapted to determine the presence of the abnormal state of the braking system if the predetermined abnormality condition is satisfied consecutively at least a predetermined first number of times in either one of the two pressure application sub-systems, or if the predetermined abnormality condition is satisfied consecutively at least a predetermined second number of times in both of the two pressure application sub-systems, the predetermined second number being smaller than the predetermined first number.

The number of operations to reduce the rear wheel brake cylinder pressure in the anti-lock braking mode is reduced not only due to abnormality of the pressure reducing valve per se, but also for other reasons even if the pressure reducing valve device is normal. For instance, the above-indicated number of the pressure reducing operations of the rear wheel brake cylinder may be reduced as compared with that of the front wheel brake cylinder, when the road surface is an uneven road surface whose friction coefficient is different in right and left areas thereof which correspond to the respective right and left wheels, or when the vehicle is turning along a curve. This phenomenon will occur because the braking system is of the diagonal or X-crossing type having the two pressure application sub-systems associated with the front and rear wheel brake cylinders.

Therefore, if the predetermined abnormality condition is satisfied consecutively at least a predetermined first number of times in one of the two sub-systems, there are two possibilities in fact. That is, the pressure reducing valve device in the sub-system in question is in fact abnormal, or alternatively, the pressure reducing valve device in question is in fact normal but the number of the pressure reducing operations of the rear wheel brake cylinder is reduced because of the vehicle running on an uneven road surface or the vehicle turning along a curve.

If the predetermined abnormality condition is satisfied consecutively at least a predetermined second number of times in both of the two sub-systems, there are two possibilities in fact. That is, the pressure reducing valve devices in both sub-systems are in fact abnormal, or alternatively, the pressure reducing valve device in only one of the two sub-systems is in fact abnormal or the number of the pressure reducing operations of the rear wheel brake cylinder is reduced in that sub-system is reduced because of the vehicle running on the uneven road surface or the vehicle turning.

In the former case wherein the diagnosis is based on the number of the pressure reducing operations of the rear wheel brake cylinder in one of the two sub-systems, the diagnosing means may erroneously determine the presence of abnormality of the braking system even though both of the sub-systems are normal. In the latter case wherein the diagnosis is based on the numbers of the pressure reducing operations in both of the two sub-systems, the determination of the presence of abnormality by the diagnosing means necessarily means that at least one of the two sub-systems is abnormal in fact. If the predetermined first and second numbers of times used in the above two different cases are the same, the accuracy of determination by the diagnosing means in the former case is lower than that in the latter case.

In view of the above, the predetermined first number of times in the former case is made larger than the predetermined second number of times in the latter case, in order to improve the accuracy of determination by the diagnosing means in the former case. According to the above arrangement wherein the first and second numbers of times are used as the threshold values, the diagnosing means determines the presence of abnormality of the braking system if the abnormality condition is satisfied consecutively the relatively small second number of times for both of the two sub-systems, or if the abnormality condition is satisfied consecutively the relatively large second number of times for either one of the sub-systems.

The second number of times larger than the first number of times has another significance other than the improvement of the abnormality determination accuracy. Namely, the degree of deterioration of the braking performance of the braking system as a whole is comparatively large where the pressure reducing valve devices in both sub-systems are abnormal in fact. In this case, it is desirable that the diagnosing means determines the presence of abnormality as soon as possible so as to prevent the braking system from operating depending upon the pressure reducing function of the pressure reducing valve devices. If the pressure reducing valve device in only one of the two sub-systems is abnormal in fact, on the other hand, the degree of deterioration of the braking performance of the braking system is not so large owing to the normal functioning of the valve device in the other sub-system. In this case, it is desirable to utilize the function of the normal valve device in controlling the braking system.

According to a second advantageous arrangement of the fourth preferred form of the invention described above, the braking system further comprises enabling means connected to the diagnosing means, for enabling the diagnosing means to operate when a load acting on the motor vehicle is smaller than a predetermined threshold. In this respect, it is noted that the actual distribution line of the front and rear wheel braking forces is usually determined so that the actual rear wheel braking force does not exceed the value as defined by the ideal distribution line, where the vehicle load is relatively large. Therefore, where the vehicle load is larger than the predetermined threshold, the number of the pressure reducing operations of the rear wheel brake cylinder is reduced even when the pressure reducing valve device is normal in fact, and the diagnosing means may erroneously determine the presence of abnormality of the valve device.

According to a third advantageous arrangement of the above fourth preferred form of the invention, the braking system further comprises enabling means connected to the diagnosing means, for enabling the diagnosing means to operate when a value of deceleration of the motor vehicle is smaller than a predetermined threshold. In this respect, it is noted that the actual distribution line of the front and rear wheel braking forces is usually determined so that the actual rear wheel braking force does not exceed the value as defined by the ideal distribution line, where the vehicle deceleration is relatively large, that is, while relatively heavy braking is applied to the vehicle. Therefore, where the deceleration value is larger than the predetermined threshold, the number of the pressure reducing operations of the rear wheel brake cylinder is reduced even when the pressure reducing valve device is normal in fact, and the diagnosing means may erroneously determine the presence of abnormality of the valve device.

According to a fourth advantageous arrangement of the above fourth preferred form of the invention, the braking device further comprises enabling means connected to the diagnosing means, for enabling the diagnosing means to operate when a load acting on the motor vehicle is smaller than a predetermined first threshold and when a value of deceleration of the motor vehicle is smaller than a predetermined second threshold.

According to a fifth advantageous arrangement of the above fourth preferred form of the invention, the braking system further comprises enabling means connected to the diagnosing means, for enabling the diagnosing means to operate when a load acting on the motor vehicle is smaller than a predetermined threshold and when the motor vehicle is running straight on a road surface whose friction coefficient is substantially equal in right and left areas thereof which correspond to the front and left wheels, respectively.

According to a sixth advantageous arrangement of the above fourth preferred form of the invention, the braking system further comprises enabling means connected to the diagnosing means, for enabling the diagnosing means to operate when a value of deceleration of the motor vehicle is smaller than a predetermined threshold and when the motor vehicle is running straight on a road surface whose friction coefficient is substantially equal in right and left areas thereof which correspond to the front and left wheels, respectively.

The second object indicated above may be achieved according to a second aspect of the present invention, which provides a braking system for a motor vehicle, comprising: a pressure source; a front wheel brake cylinder and a rear wheel brake cylinder which are connected to the pressure source and produce respective front and rear braking forces for braking respective front and rear wheels of the vehicle;

and a pressure reducing valve device for reducing a pressure of the pressure source so that the reduced pressure is applied to the front wheel brake cylinder, the pressure reducing device including a plurality of check valves which are connected in series with each other and which permit a flow of a brake fluid in a first direction from the pressure source toward the front wheel brake cylinder when a pressure of the pressure source is higher than a pressure in the front wheel brake cylinder by more than a predetermined valve opening pressure difference, the check valves inhibiting a flow of the brake fluid in a second direction opposite to the first direction.

In the present braking system according to the second aspect of this invention, the pressure reducing valve device includes two or more check valves which are connected in series with each other. Accordingly, the function of the pressure reducing valve device is not fully deteriorated unless all of these check valves are abnormal or defective, for example, unless foreign matters are caught in all of these check valves. Consequently, the operating reliability of the braking system is significantly improved.

In one preferred form of the second aspect of the invention described above, the braking system is an X-crossing type braking system for a four-wheel motor vehicle including the front and rear wheels, which X-crossing type braking system has two pressure application sub-systems which are connected to respective two mutually independent pressurizing chambers of a master cylinder, each of the two pressure application sub-systems including (a) a front brake cylinder passage connecting a corresponding one of the two pressurizing chambers of the master cylinder and the front wheel brake cylinder, (b) a rear brake cylinder passage connecting the front brake cylinder passage and the rear wheel brake cylinder, (c) a first shut-off valve which is disposed in a portion of the front brake cylinder passage between the master cylinder and a point of connection of the front and rear brake cylinder passages, the first shut-off valve being open and closed respectively in a normal braking mode and an anti-lock braking mode of the front and rear wheel brake cylinders, (d) a normally-open second shut-off valve disposed in the rear brake cylinder passage, (e) a reservoir passage connected at one of opposite ends thereof to a portion of the rear brake cylinder passage between the second shut-off valve and the rear wheel brake cylinder, (f) a normally-closed third shut-off valve disposed in the reservoir passage, (g) a reservoir connected to the other end of the reservoir passage, (h) a pump passage connected at one of opposite ends thereof to the reservoir and at the other end thereof to a portion of the rear brake cylinder passage between the second shut-off valve and the point of connection, (i) a pump disposed in the pump passage for pressurizing a brake fluid received from the reservoir and delivering the pressurized brake fluid to a portion of each pressure application sub-system, and (j) a controller for controlling the first, second and third shut-off valves for controlling pressures in the front and rear wheel brake cylinders in the anti-lock braking mode, and wherein the pressure reducing valve device is disposed in a portion of the rear brake cylinder passage between the point of connection between the front and rear brake cylinder passages and a point of connection between the rear brake cylinder passage and the pump passage. In this preferred form of the invention, the pressure reducing valve device includes as the plurality of check valves a first check valve consisting of two check valves, and a second check valve disposed in parallel connection with the first check valve, the two check valves cooperating to permit a flow of the brake fluid in a first direction from the pump toward the front wheel brake cylinder when a pressure of the pump is higher than the pressure in the front wheel brake cylinder by more than the predetermined valve opening pressure difference. The first check valve inhibits a flow of the brake fluid in a second direction opposite to the first direction. The second check valve permitting a flow of the brake fluid in said second direction from the front wheel brake cylinder toward the pump such that a pressure difference across the second check valve is substantially zero. The second check valve inhibiting a flow of the brake fluid in said first direction.

The braking system according to the above preferred form of the invention may be adapted such that at least a part of the portion of the rear brake cylinder passage between the point of connection of the front and rear brake cylinder passages and the point of connection between the rear brake cylinder passage and the pump passage consists of an inner passage and an outer passage which are formed substantially concentrically with and independently of each other. The first check valve is disposed in one of the inner and outer passages, while the second check valve is disposed in the other of the inner and outer passages.

BRIEF DESCRIPTION OF THE DRAWINGS

The above and optional objects, features, advantages and technical significance of the present invention will be better understood by reading the following detailed description of presently preferred embodiments of the invention, when considered in conjunction with the accompanying drawings, in which:

FIG. 11 is a view showing conditions in which the controller determines the presence of abnormality of the pressure reducing valve device in a second embodiment of the anti-lock braking system of the present invention;

FIGS. 17 and 18 are time charts for explaining a principle of the abnormality determining routine of FIG. 15;

DETAILED DESCRIPTION OF THE PREFERRED EMBODIMENTS

Figure 1:
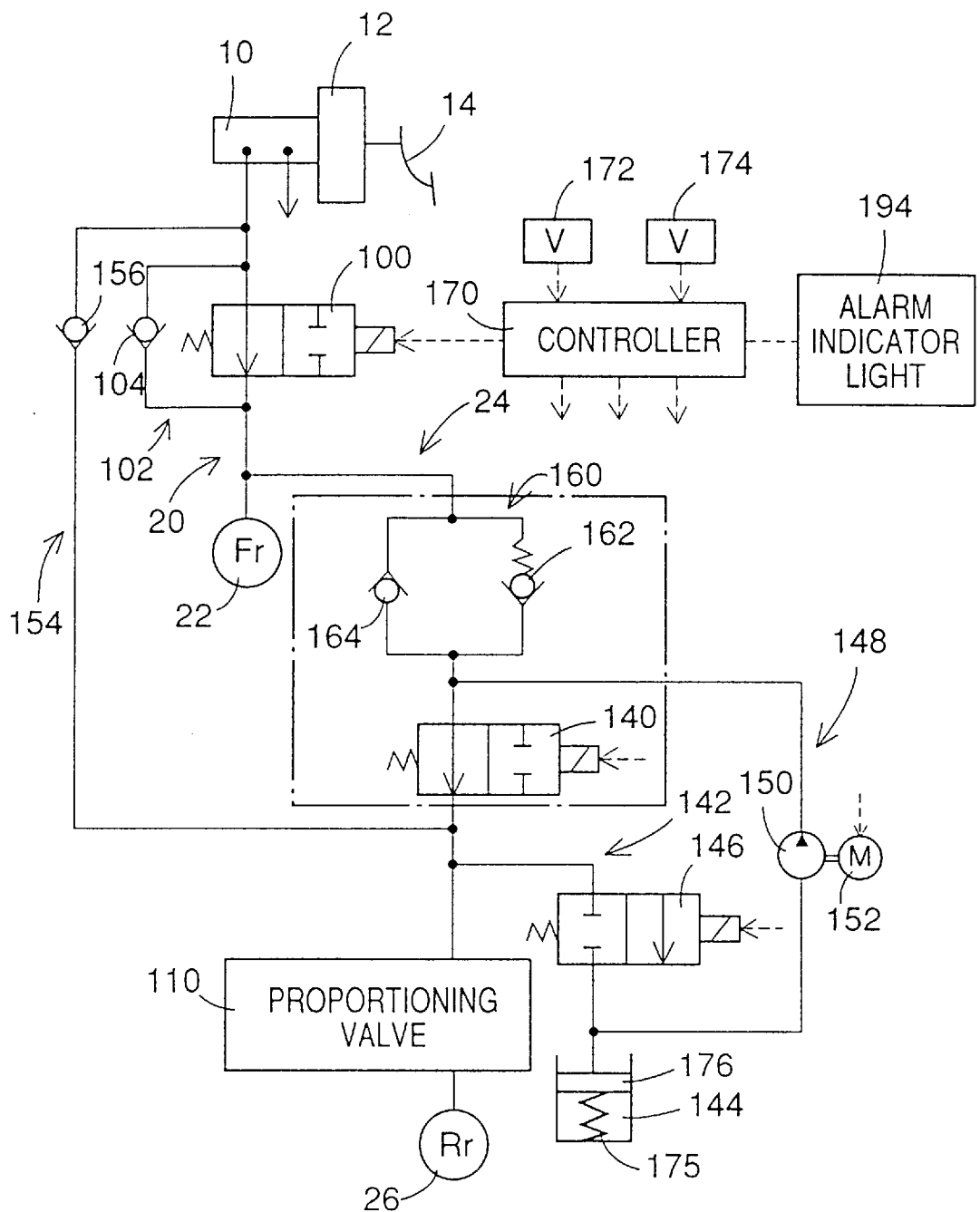
FIG. 1 is a schematic view illustrating an anti-lock braking system according to a first embodiment of this invention.

Referring first to FIG. 1, there is shown an anti-lock braking system of diagonal or X-crossing type for a motor vehicle. In the figure, reference numeral 10 denotes a master cylinder which functions as a hydraulic pressure source. The master cylinder 10 is of a tandem type in which two mutually independent fluid pressurizing chambers are disposed in series. The master cylinder 10 is linked with a brake operating member in the form of a brake pedal 14 through a booster 12. Upon operation or depression of the brake pedal 12 by the driver or operator of the motor vehicle, equal pressures of a brake fluid are mechanically generated in the two pressurizing chambers of the master cylinder 10.

One of the two pressurizing chambers of the master cylinder 10 is connected to brake cylinders of hydraulically operated brakes for a front left wheel and a rear right wheel of the vehicle, while the other pressurizing chamber is connected to brake cylinders of hydraulically operated brakes for a front right wheel and a rear left wheel of the vehicle. These brake cylinders are hereinafter referred to as "wheel brake cylinders". Thus, the braking system has two mutually independent pressure application sub-systems, one of which has the front left wheel brake cylinder and the rear right wheel brake cylinder, and the other of which has the front right wheel brake cylinder and the rear left wheel brake cylinder. Since the two pressure application sub-systems are identical in construction with each other, only one of these two sub-systems is illustrated in FIG. 1 and will be hereinafter described.

In each pressure application sub-system, the corresponding pressurizing chamber of the master cylinder 10 is connected to the front wheel brake cylinder 22 through a front brake cylinder passage 20. A rear brake cylinder passage 24 is connected at one end thereof to the front wheel brake cylinder passage 20 and at the other end to the rear wheel brake cylinder 26.

A normally-open first solenoid-operated shut-off valve 100 is disposed in a portion of the front brake cylinder passage 20 between the master cylinder 10 and a point of connection of the front and rear wheel brake cylinder passages 20, 24. Further, a by-pass return passage 102 is provided in parallel with the first shut-off valve 100, so as to by-pass the shut-off valve 100. The by-pass return passage 102 is provided with a check valve 104, which inhibits a flow of the brake fluid in a first direction from the master cylinder 10 toward the front wheel brake cylinder 22, and permits a flow of the brake fluid in a second direction opposite to the first direction. Namely, the brake fluid is permitted to flow through the check valve 104 in the second direction when the pressure downstream of the first shut-off valve 100 (on the side of the front wheel brake cylinder 22) is higher than the pressure upstream of the shut-off valve 100 (on the side of the master cylinder 10), by more than a predetermined difference (hereinafter referred to as "valve opening pressure difference"). However, this valve opening pressure difference of the check valve 104 is substantially zero.

Figure 2:
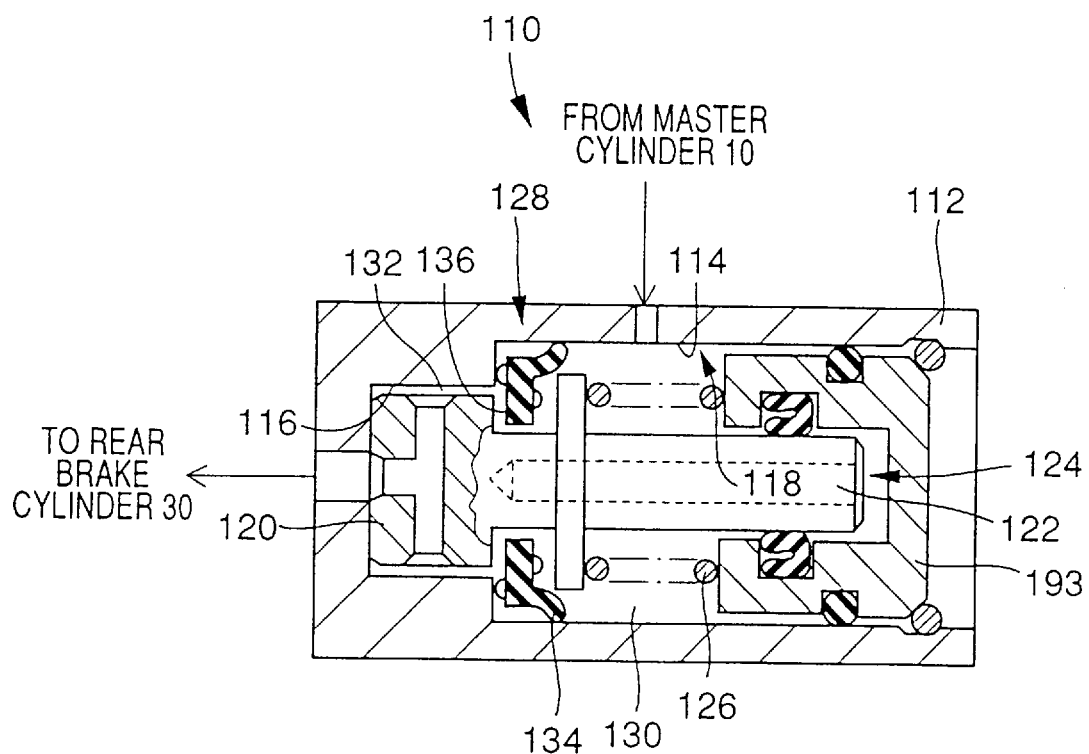
FIG. 2 is a front elevational view in cross section of a proportioning valve provided in the braking system of FIG. 1.

A proportioning valve or P valve 110 is provided in the rear brake cylinder passage 24. As shown in FIG. 2, the P valve 100 has a housing 112, which has a stepped cylinder bore 118 with a large-diameter portion 114 and a small-diameter portion 116. A stepped valve piston 124 having a large-diameter portion 120 and a small-diameter portion 122 is slidably received in the stepped cylinder bore 118. The valve piston 124 is biased by biasing means in the form of a spring 126 so that the piston 124 is normally held in a non-operated position in which the end face of the large-diameter portion 120 abuts on the bottom wall of the small-diameter portion 116 of the housing 112. Between the cylinder bore 118 and the valve piston 124, there is disposed a sealing member in the form of a cup seal 128. This cup seal 128 divides the space within the cylinder bore 118 into two sections. One of these two sections which is on the side of the large-diameter portion 114 serves as an input chamber 130, while the other section on the side of the small-diameter portion 116 serves as an output chamber 132. The input chamber 130 is connected to the master cylinder 10, while the output chamber 132 is connected to the rear wheel brake cylinder 26.

The cup seal 128 consists of a one-way sealing portion 134 and a two-way sealing portion 136. The one-way sealing portion 134 inhibits a flow of the brake fluid in the direction from the input chamber 130 toward the output chamber 132 while the one-way sealing portion 134 is in fluid-tight contact with the circumferential surface of the large-diameter portion 114 of the cylinder bore 118. The one-way sealing portion 134 permits a flow of the brake fluid in the direction from the output chamber 132 toward the input chamber 130 while the sealing portion 134 is spaced apart from the surface of the large-diameter portion 114. When the valve piston 124 is moved from the non-operated position of FIG. 2 to an operated position (in the right direction as seen in the figure), the shoulder surface between the large-diameter and small-diameter portions 120, 122 of the piston 124 is brought into abutting contact with the two-way sealing portion 136, thereby inhibiting flows of the brake fluid in the opposite directions between the input and output chambers 130, 132. When the valve piston 124 is placed in the non-operated position of FIG. 2, the two-way sealing portion 136 is unseated off the shoulder surface of the piston 124, whereby the fluid is permitted to flow between the input and output chambers 130, 132.

The cup seal 128 has an annular protrusion formed on each of the opposite surfaces which define the input and output chambers 130, 132. The annular protrusions have a semi-circular cross sectional shape as seen in FIG. 2. The annular protrusion on the side of the input chamber 130 prevents the cup seal 128 from contacting the valve piston 124 at the entire area of the surface on the side of the input chamber 130, while the annular protrusion on the side of the output chamber 132 prevents the cup seal 128 from contacting the shoulder surface between the large-diameter and small-diameter portions 120, 122 of the cylinder bore 118, at the entire area of the surface on the side of the output chamber 132.

As shown in FIG. 1, a normally-open second solenoid-operated shut-off valve 140 is disposed in a portion of the rear brake cylinder passage 24 between the P valve and the point of connection of the front and rear brake cylinder passages 20, 24. A reservoir passage 142 is connected at one end thereof to a portion of the rear brake cylinder passage 24 between the P valve 110 and the second shut-off valve 140, and at the other end to a reservoir 144. A normally-closed third solenoid-operated shut-off valve 146 is provided in the reservoir passage 142.

A pump passage 148 is connected at one end thereof to the reservoir 144 and at the other end to the rear brake cylinder passage 24. A pump 150 is provided in the pump passage 148, for pressurizing the brake fluid sucked from the reservoir 144. The pump 150 is of a plunger type driven by a motor 152 to deliver the pressurized fluid in an intermittent manner. The output end or delivery end (the other end indicated above) of the reservoir passage 148 is connected to a portion of the rear brake cylinder passage 24 on the upstream side of the second shut-off valve 140, namely, on the side of the master cylinder 10.

A return passage 154 is connected at one end thereof to a portion of the rear brake cylinder passage 24 between the P valve 110 and the second shut-off valve 140, and at the other end to a portion of the front brake cylinder passage 20 between the master cylinder 10 and the first shut-off valve 100. A check valve 156 is provided in the return passage 154. This check valve 156 inhibits a flow of the brake fluid in a direction from the master cylinder 10 toward the rear wheel brake cylinder 26, and permits a flow of the brake fluid in the reverse direction with the valve opening pressure difference being substantially zero.

A pressure reducing valve device 160 is disposed in a portion of the rear brake cylinder passage 24 between the point of connection of the rear brake cylinder passage 24 and the pump passage 148 and the point of connection of the front and rear brake cylinder passages 20, 24. This pressure reducing valve device 160 includes a first check valve 162 whose opening pressure difference is not substantially zero, and a second check valve 164 whose opening pressure difference is substantially zero. The first and second check valves 162, 164 are disposed in parallel with each other and have opposite directions in which the brake fluid is permitted to flow. In the present embodiment, the pump 150 serves as the hydraulic pressure source during the anti-lock pressure control or braking operation, in principle, and the first check valve 162 serves as a check valve which is so oriented as to permit a flow of the brake fluid in a direction from the pump 150 toward the front wheel brake cylinder 22, when the pressure of the brake fluid delivered from the pump 150 is higher than the pressure in the front wheel brake cylinder 22 by more than a preset or predetermined opening pressure difference of the check valve 162.

Figure 3:
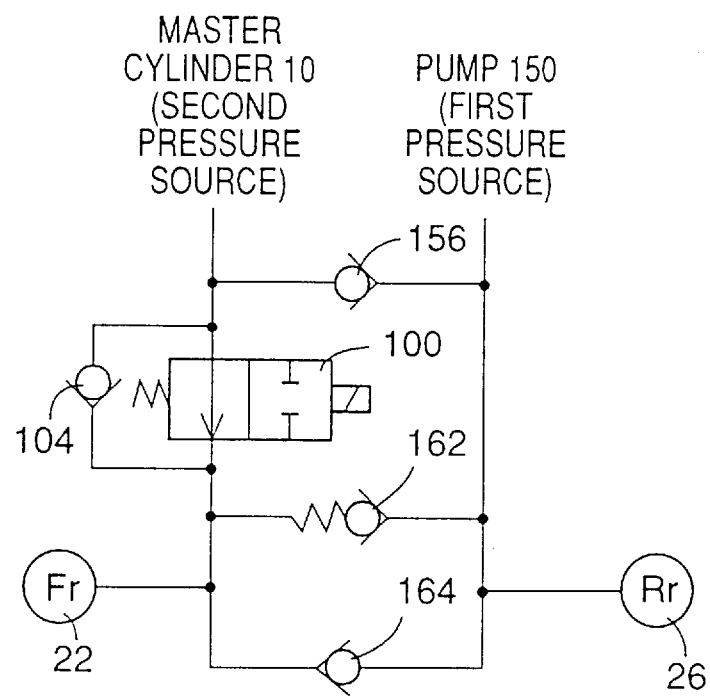
FIG. 3 is a hydraulic circuit diagram schematically showing flows of a brake fluid to and from a master cylinder, a pump and front and rear wheel brake cylinders in the braking system of FIG. 1.

Referring next to FIG. 3, there will be described flows of the brake fluid to and from the master cylinder 10, pump 150 and front and rear wheel brake cylinders 22, 26. It is noted that FIG. 3 schematically shows a major portion of the brake fluid circuit, while ignoring the provision of both of the P valve 110 and the normally-open second shut-off valve 140.

During a normal operation of the present braking system without an operation of the pump 150, the brake fluid pressurized by the master cylinder 10 is supplied to the front wheel brake cylinder 20 through the first shut-off valve 100, and to the rear wheel brake cylinder 26 through the first shut-off valve 100 and the second check valve 164 of the pressure reducing valve device 160. Since the opening pressure difference of the second check valve 164 is substantially zero, almost the same braking pressures are applied to the front and rear wheel brake cylinders 22, 26.

When the pump 150 is operated, on the other hand, the first shut-off valve 100 is closed, and the brake fluid delivered from the pump 150 is supplied to the front wheel brake cylinder 22 through the first check valve 162, and is supplied to the rear wheel brake cylinder 26 without flowing through the first check valve 162. Since the opening pressure difference of the first check valve 162 is not substantially zero, the braking pressure in the front wheel brake cylinder 22 is made lower than that in the rear wheel brake cylinder 26 by an amount corresponding to the preset opening pressure difference of the first check valve 162.

Thus, the master cylinder 10 serves as the hydraulic pressure source (second pressure source as indicated in FIG. 2) during the normal operation of the braking system without an operation of the pump 150, and substantially the same braking pressures are applied to the front and rear wheel brake cylinders 22, 26. During operation of the pump 150, on the other hand, the pump 150 serves as the hydraulic pressure source (first pressure source as indicated in FIG. 3), and the braking pressures to be applied to the front and rear wheel brake cylinders 22, 26 are regulated such that the braking pressure in the front wheel brake cylinder 22 is lower than that in the rear wheel brake cylinder 26.

The construction of the first and second check valves 162, 164 will be described later in detail.

The solenoids of the first, second and third solenoid-operated shut-off valves 100, 140, 146 are connected to a controller 170, which is principally constituted by a computer, A/D converters and drivers. The computer incorporates a central processing unit (CPU), a read-only memory (ROM), a random-access memory (RAM) and a bus. The controller 170 selectively opens and closes the shut-off valves 100, 140, 146 as needed, depending upon the output signals of wheel speed sensors 172, 174, which represent the rotating speeds of the front and rear wheels of the vehicle.

Also connected to the controller 170 is an alarm indicator light 194, which is activated when an abnormality or defect of the pressure reducing valve device 160 is detected by the controller 170. Namely, the indicator light 194 is turned on to inform the vehicle operator that the anti-lock braking system is not normally functioning in the presence of some abnormality of the valve device 160.

The motor 152 for driving the pump 150 is also controlled by the controller 170. In principle, the motor 152 and the pump 150 are held off while the reservoir 144 is empty. Although the motor 152 may be kept operated as long as the wheel braking pressures are controlled in the anti-lock manner, the pump 150 is turned off when the reservoir 144 is fully evacuated, in order to minimize the operating noise of the braking system.

The evacuation of the reservoir 144 may be detected directly by a position sensor (e.g., proximity switch) adapted to detect the axial position of a piston 176 of the reservoir 144, or indirectly by a load sensor adapted to detect a load acting on the motor 152 on the basis of an electric current applied to the motor 152, or by a timer adapted to measure the time of a continuous operation of the motor 152. Where the evacuation of the reservoir 144 is indirectly detected, the motor 152 is turned off when the detected load is lowered below a predetermined threshold value or when the measured continuous operation time exceeds a predetermined limit. The piston 176 indicated above is slidably received in the reservoir 144 and is biased by biasing means in the form of a spring 175.

There will next be described in detail an operation of the controller 170 for controlling the shut-off valves 100, 140, 146.

During braking of the vehicle by operation of the brake pedal 14, the controller 100 monitors the rotating conditions (e.g., deceleration values, slip amounts and slip ratios) of the individual wheels of the vehicle, on the basis of the output signals of the wheel speed sensors 172, 174, and determine whether any wheels have a locking tendency. The controller 170 controls the shut-off valves 100, 140, 146 in a selected one of seven pressure control modes as indicated in TABLE 1 below, to control the wheel brake cylinders 22, 26. These seven pressure control modes are established by respective different combinations of the open and closed states of the three shut-off valves 100, 140, 146. The open and closed states are indicated by "O" and "C" in TABLE 1.

TABLE 1

| Mode | States of Shut-Off Valves | | | Pressure Control States of Front and Rear Brake Cylinders | |
| --- | --- | --- | --- | --- | --- |
|  | 1st | 2nd | 3rd | Front | Rear |
| 1 | O | O | C | M/C Increase | M/C Increase |
| 2 | O | C | C | M/C Increase | Hold |
| 3 | O | C | O | M/C Increase | Reduction |
| 4 | C | O | C | Pump Increase | Pump Increase |
| 5 | C | C | C | Pump Increase | Hold |
| 6 | C | C | O | Pump Increase | Reduction |
| 7 | C | O | O | Reduction | Reduction |

To control the anti-lock braking system in the anti-lock manner, the controller 170 performs the following steps: (a) determining whether any one of the front and rear wheels of the two pressure application sub-systems has a locking tendency, and if it is determined that any wheel has a locking tendency, determining on the basis of the rotating condition of that wheel a pressure control command (selected from among a pressure reducing command, a pressure holding command and a pressure increasing command( which should be generated to control the braking pressure in the brake cylinder of the wheel in question; (b) then selecting one of the seven pressure control modes depending upon the determined pressure control command and depending upon whether the wheel having the locking tendency is a front or rear wheel; and (c) then controlling the pressure in the brake cylinder of the wheel in question in the selected pressure control mode. To this end, the ROM of the controller 170 stores routines for determining the pressure control commands for the individual wheels on the basis of the rotating conditions of the wheels, and routines for controlling (turning on and off) the solenoids of the respective shut-off valves 100, 140, 146 according to the determined pressure control commands.

The anti-lock pressure control operation of the present braking system will be described in detail, assuming that the front wheel associated with one of the two pressure application sub-systems has a locking tendency without a locking tendency of the rear wheel.

In this case, the pressure in the front wheel brake cylinder 22 should be first reduced. However, the seven pressure control modes available do not include a mode for reducing only the pressure in the front wheel brake cylinder 22, as is apparent from TABLE 1. Therefore, the seventh pressure control mode is selected to reduce the pressures in both of the front and rear wheel brake cylinders 22, 26.

In the seventh pressure control mode, the solenoid of the first shut-off valve 100 is turned ON to close this shut-off valve 100, so that the front and rear wheel brake cylinders 22, 26 are disconnected from the master cylinder 10. Further, the solenoid of the third shut-off valve 146 is turned ON to open this valve 146, so that the pressures in the front and rear wheel brake cylinders 22, 26 are reduced. Described more specifically, the front wheel brake cylinder 22 is brought into communication with the reservoir 144 through the second check valve 164, normally-open second shut-off valve 140 and now opened third shut-off valve 146, whereby the brake fluid is permitted to flow from the front wheel brake cylinder 22 to the reservoir 144. At the same time, the rear wheel brake cylinder 26 is communicated with the reservoir 144 through the P valve 110 and the opened third shut-off valve 146, and the brake fluid is permitted to flow from the rear wheel brake cylinder 26 to the reservoir 144. Thus, the braking pressures in both of the front and rear wheel brake cylinders 22, 26 are reduced in the seventh pressure control mode.

The seventh pressure control mode of operation is terminated when the locking tendency of the front wheel is eliminated or considerably reduced as a result of the reduction of the pressures in the wheel brake cylinders 22, 26. Then, the pressure in these cylinders 22, 26 are controlled in a selected one of the fourth, fifth, sixth and seventh pressure control modes, depending upon the locking tendencies of the front and rear wheels.

Figure 5:
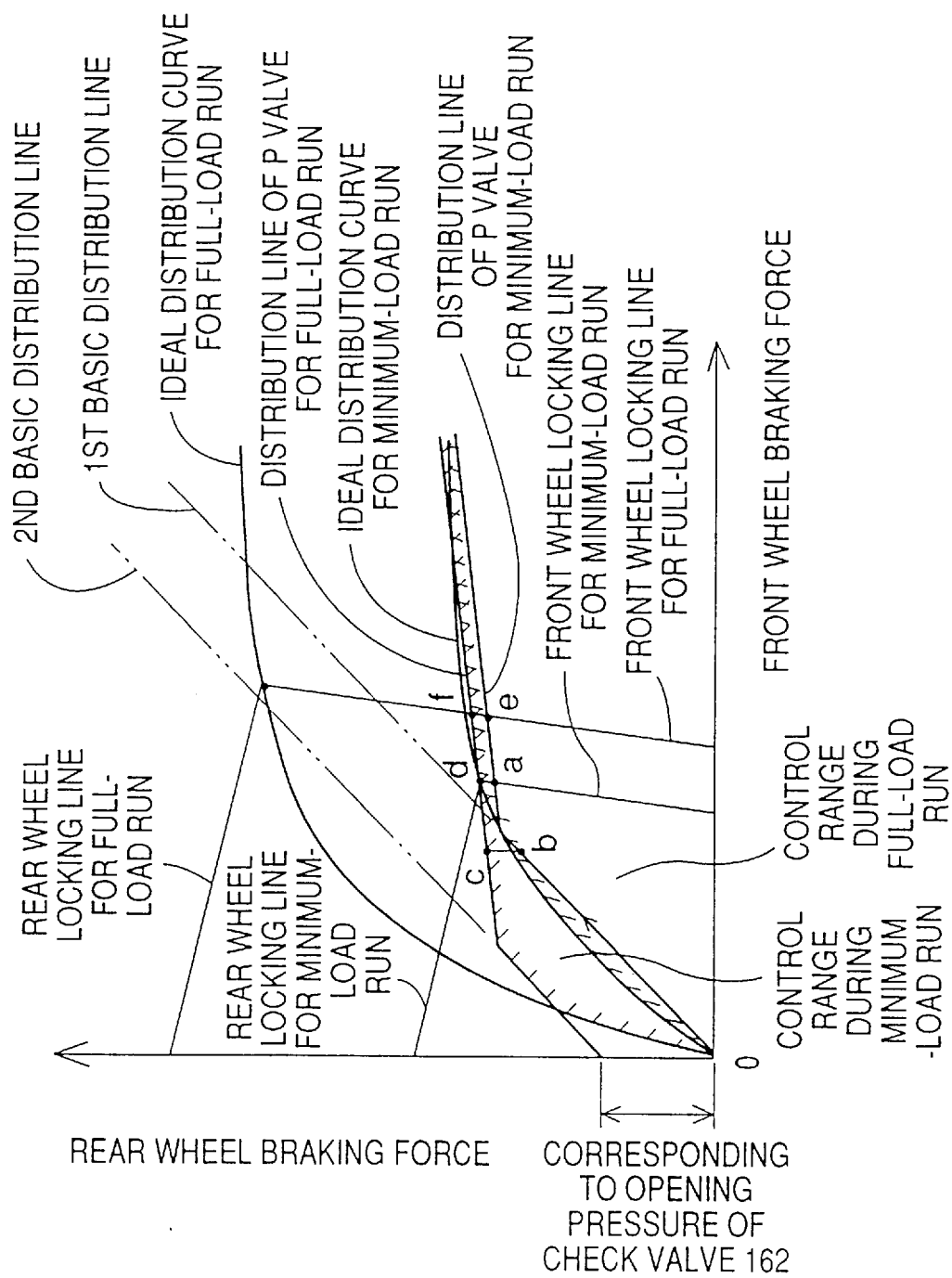
FIG. 5 is a graph explaining a relationship between the braking forces of the front and rear wheels as controlled in the braking system of FIG. 1.

In the fourth pressure control mode, the first and third shut-off valves 100, 146 are both closed, while the second shut-off valve 140 is opened, so that the fluid delivered from the pump 150 is returned to the front wheel brake cylinder 22 through the first check valve 162, and to the rear wheel brake cylinder 26 through the opened second shut-off valve 140 and the P valve 110, whereby the pressures in the front and rear wheel brake cylinders 22, 26 are both increased. In this fourth pressure control mode, the pressure of the fluid delivered from the pump 150 is reduced by the first check valve 162 by the preset opening pressure difference of the check valve 162. Therefore, the braking pressure in the front wheel brake cylinder 22 is lower than the braking pressure in the rear wheel brake cylinder 26, by the opening pressure difference of the check valve 162, when the braking pressures are increased. The distribution of the braking forces of the front and rear wheel brake cylinders 22, 26 in this condition is indicated in FIG. 5 as second basic distribution line which is not influenced by the anti-lock pressure control operation and an operation of the P valve 110.

In the fifth pressure control mode, the three shut-off valves 100, 140, 146 are all closed, and the pressure in the front wheel brake cylinder 22 is increased by operation of the pump 150 as in the fourth pressure control mode, while the pressure in the rear wheel brake cylinder 26 is held constant.

Figure 4:
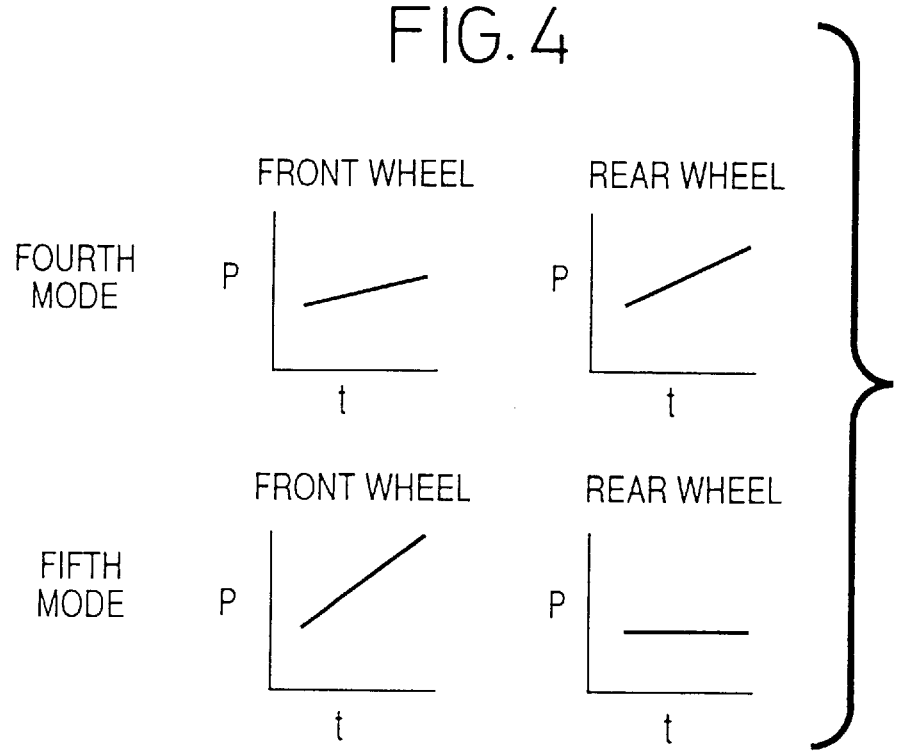
FIG. 4 is a graph explaining changes in the front and rear wheel brake cylinder pressures as controlled differently in an anti-lock fashion in fourth and fifth modes of operation of the braking system of FIG. 1.

In the fifth pressure control mode, the brake fluid delivered from the pump 150 is not returned to the rear wheel brake cylinder 26, but is returned to only the front wheel brake cylinder 22. In the fourth mode, on the other hand, the brake fluid from the pump 150 is returned also to the rear wheel brake cylinder 26. Accordingly, the rate of increase in the pressure in the front wheel brake cylinder 22 is higher in the present fifth mode than in the fourth mode, as indicated in FIG. 4. As also shown in this figure, the pressure in the rear wheel brake cylinder 26 is increased in the fourth mode while the pressure in the cylinder 26 is held constant in the fifth mode.

In the sixth pressure control mode, the first and second shut-off valves 100, 140 are both closed while the third shut-off valve 146 is opened, whereby the pressure in the front wheel brake cylinder 22 is increased as in the fourth mode, while the pressure in the rear wheel brake cylinder 26 is reduced.

In principle, the first, second and third pressure control modes are not used for the anti-lock control of the braking pressure of the front wheel brake cylinder 22. In these three modes, the first shut-off valve 100 is opened. During the anti-lock pressure control operation, it is desirable to disconnect the front and rear wheel brake cylinders 22, 26 from the master cylinder 10, in order to reduce the delivery pressure of the pump 150 and minimize the pressure pulsation of the fluid delivered from the pump 150. However, if it becomes necessary to increase the pressure in the front or rear wheel brake cylinder 22, 26 after the reservoir 144 is fully evacuated with the entire volume of the fluid pumped up by the pump 150, an appropriate one of the first, second and third pressure control modes is established to increase the pressure in the wheel brake cylinder 22, 26 in question with the pressure generated by the master cylinder 10.

When the pressure in the front wheel brake cylinder 22 is increased by operation of the pump 150 in the fourth or fifth pressure control mode, the check valve 104 functions as a pressure relief valve to prevent the front wheel braking pressure from exceeding the pressure in the master cylinder 10.

While the operation of the braking system upon occurrence of a locking tendency of the front wheel without a locking tendency of the rear wheel, there will be described an operation of the braking system upon occurrence of a locking tendency of the rear wheel without a locking tendency of the front wheel.

In this case, it is necessary to first reduce the pressure in the rear wheel brake cylinder 26. To this end, the braking system is first placed in the third pressure control mode wherein the first and third shut-off valves 1001, 146 are opened while the second shut-off valve 140 is closed, whereby substantially no anti-lock pressure control is effected with respect to the pressure in the front wheel brake cylinder 22. That is, the pressure in the front wheel brake cylinder 22 is increased by the pressure generated by the master cylinder 10, while the pressure in the rear wheel brake cylinder 26 is reduced through the opened third shut-off valve 146.

Subsequently, the first through seventh pressure control modes are selectively established by the controller 170 as needed. While the front wheel does not have a locking tendency, the first, second and third pressure control modes are selectively established, and only the pressure in the rear wheel brake cylinder 26 is controlled in the anti-lock manner. If the front wheel as well as the rear wheel has a locking tendency, or if only the front wheel has a locking tendency with the locking tendency of the rear wheel being eliminated, the front and rear wheel braking pressures or the front wheel braking pressure is/are controlled in the anti-lock manner as in the case here the front wheel has a locking tendency without a locking tendency of the rear wheel.

The rear wheel has a locking tendency without a locking tendency of the front wheel, for example if the front wheel lies on an area of an uneven friction-coefficient road surface which area has a relatively high friction coefficient while the rear wheel lies on an area of the road surface which has a relatively low friction coefficient. In this case, it is preferable to maximize the front wheel braking pressure while preventing the locking of the front wheel, so that the relatively high friction coefficient of the road surface area is utilized by the front wheel to reduce the braking distance of the vehicle. ON the other hand, it is preferable to maximize the cornering force acting on the rear wheel, for improving the steering or directional stability of the vehicle. In other words, it is desired that the braking system be capable of increasing the front wheel braking pressure without increasing the rear wheel braking pressure, or capable of reducing the rear wheel braking pressure without increasing the front wheel braking pressure. In the present embodiment, the fifth or sixth pressure control mode is established to increase the front wheel braking pressure without an increase in the rear wheel braking pressure, and the sixth pressure control mode is established to reduce the rear wheel braking pressure without a decrease in the front wheel braking pressure. Thus, the present embodiment assures not only reduction in the required braking distance of the vehicle, but also an improvement of the steering stability of the vehicle in the case of braking of the vehicle while the front wheel is on the high friction-coefficient area of an uneven friction-coefficient road surface while the rear wheel is on the low friction-coefficient area.

There will be described advantages of the present anti-lock braking system, by reference to the graph of FIG. 5.

In a normal braking of the vehicle initiated by depression of the brake pedal 14 by the vehicle operator, the master cylinder 10 rather than the pump 150 functions as the hydraulic pressure source, and the master cylinder pressure is applied to the front wheel brake cylinder 22, irrespective of the existence of the pressure reducing valve device 160. Accordingly, the front-rear braking force distribution point is moved from the zero point of the coordinate system of the graph of FIG. 5, along a first basic distribution line and along a distribution line of the P valve 110 for the minimum-load run of the vehicle.

If the vehicle is in the minimum-load run (one form of a vehicle run with a relatively small load), the braking force distribution point reaches a point "a" as indicated in FIG. 5, when the depression force acting on the brake pedal 14 has been increased to increase the front wheel braking pressure to a level slightly lower than a level at which the front wheel begins to be locked on the road surface. When the anti-lock control of the front braking pressure is started due to an excessive degree of locking of the front wheel as a result of a further increase in the depression force of the brake pedal 14, both the front wheel braking pressure and the rear wheel braking pressure are reduced in the seventh pressure control mode. Consequently, the braking force distribution point is moved from the point "a" in the left direction, as indicated in the graph of FIG. 5, to a point which lies on the first basic distribution line or the distribution line of the P valve 110 for the minimum-load run. In this specific example, the braking force distribution point is moved to point "b". The above explanation is based on a assumption that the brake pedal 14 is held depressed and the master cylinder pressure is continuously increased even after the first reduction of the front and rear wheel braking pressures is started, namely, an assumption that the delivery pressure of the pump 150 is increased from the level at the time of start of the first reduction of the wheel braking pressures.

If the fourth pressure control mode of operation is initiated to increase the front and rear wheel braking pressures as a result of elimination of the locking tendency of the front wheel, the brake fluid delivered from the pump 150 is supplied to the front wheel brake cylinder 22, with the pressure reduction corresponding to the opening pressure difference of the first check valve 162. However, the brake fluid delivered from the pump 150 is supplied to the rear wheel brake cylinder 26, without the pressure reduction. It is noted that some volume of the brake fluid has been stored in the reservoir 144 by the time the locking tendency of the front wheel has been eliminated, that is, when the fourth pressure control mode of operation is initiated. After the delivery of the brake fluid from the pump 150 is started, the front wheel braking pressure and force are held constant and only the rear wheel braking pressure and force are increased, until the first check valve 162 is opened. Accordingly, the braking force distribution point is moved from the point "b" in the positive direction along the vertical axis of the graph of FIG. 5 (along which the rear wheel braking force is taken), to a point which lies on the second basic distribution line or a distribution line of the P valve 110 for the full-load run. In this specific example, the braking force distribution point is moved to point "c". Subsequently, the distribution point is moved from the point "c", along the distribution line of the P valve 110 for the full-load run, in the direction of increasing the rear wheel braking force, and eventually reaches point "d" of intersection between a rear wheel locking line for the minimum-load run and the distribution line of the P valve 110 for the full-load run. Then, the rear wheel braking pressure is controlled in the anti-lock manner so as to eliminate the locking tendency of the rear wheel.

The second basic distribution line and the distribution line of the P valve 110 for the full-load run are obtained by translating respectively the first basic distribution line and the distribution line of the P valve 110 for the minimum-load run, in the positive direction along the vertical axis of the graph of FIG. 5, by a distance corresponding to the opening pressure difference of the check valve 162, as indicated in FIG. 5.

If the vehicle is now in the full-load run (one form of a vehicle run with a relatively large load), the front-rear braking force distribution point is moved to point "e" as indicated in FIG. 5, when the depression force acting on the brake pedal 14 is increased to increase the front wheel braking force to a level slightly lower than the wheel locking level. A further increase in the brake pedal depression force will cause initiation of an anti-lock control of the front wheel braking pressure. As a result, the braking force distribution point is moved to the point "b" indicated above.

When the fourth pressure control mode of operation is initiated to increase the front and rear wheel braking pressures as a result of elimination of the locking tendency of the front wheel, the braking force distribution point is moved from the point "b" in the positive direction of the vertical axis to the point "c" as in the above case. With a further increase in the front and rear wheel braking pressures by operation of the pump 150, the braking force distribution point is further moved from the point "c" along the distribution line of the P valve 110 for the full-load run, and eventually reaches the point "f" of intersection between the distribution line of the P valve 110 for the full-load run and a front wheel locking line for the full-load run. Thereafter, the anti-lock control is effected to eliminate the locking tendency of the front wheel.

In the present embodiment, therefore, the sum of the front and rear wheel braking forces or the total wheel braking force during the full-load vehicle run is increased with respect to that in the conventional braking system in which the anti-lock pressure control operation is effected according to the first basic distribution line even during the full-load vehicle run. Accordingly, the required braking distance of the vehicle can be reduced in the present braking system. It will also be understood from the graph of FIG. 5 that the rear wheel braking pressure or force during the full-load vehicle run can be effectively increased to thereby reduce the required vehicle braking distance, even when the ideal rear braking force is smaller than the threshold level of the P valve 110.

Figure 6:
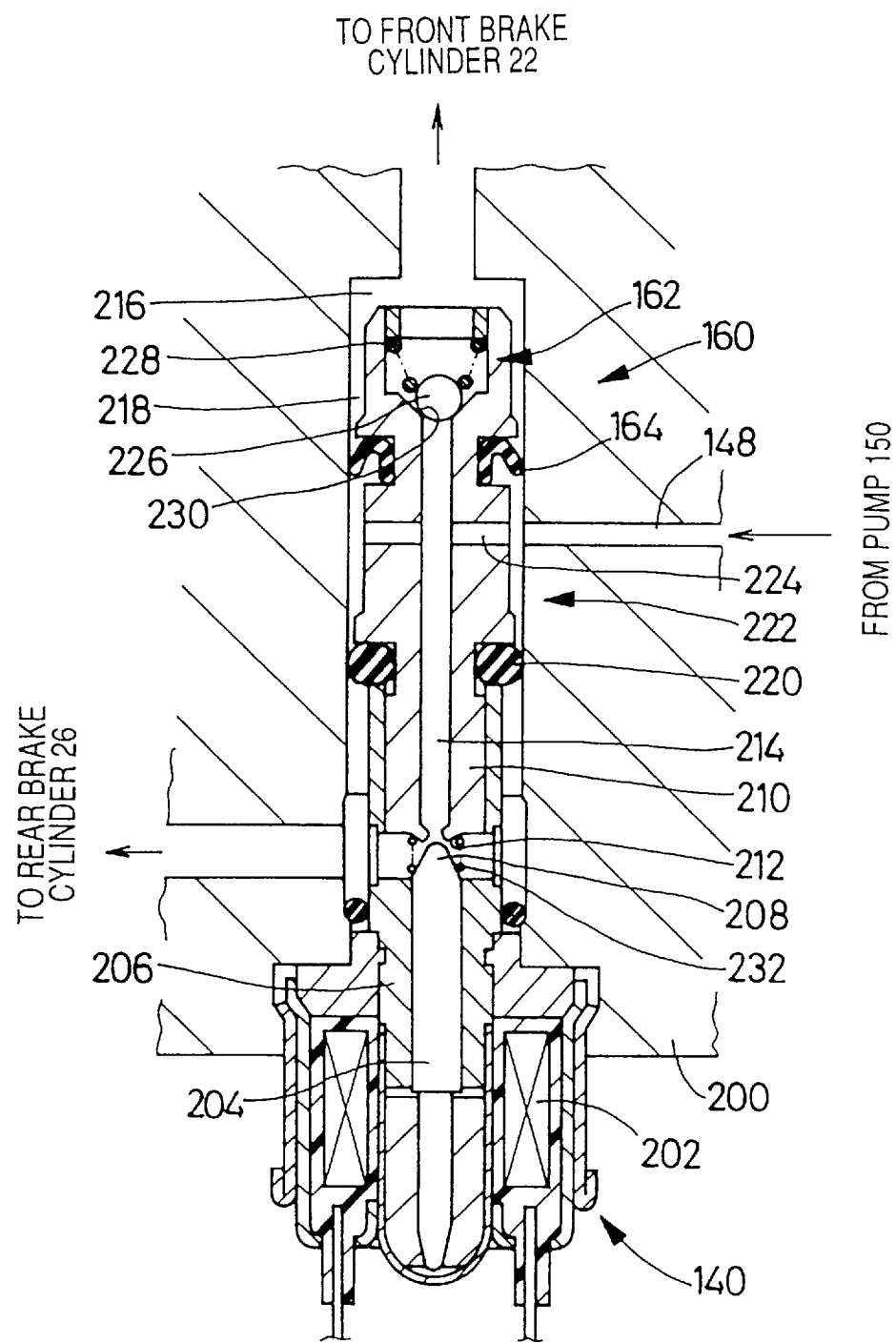
FIG. 6 is a front elevational view in cross section showing details of construction of a pressure reducing valve device and a second shut-off valve which are provided in the braking system of FIG. 1.

Referring next to FIG. 6, there will be described in detail the construction of the pressure reducing valve device 160.

In the present braking system, the pressure reducing valve device 160 and the second solenoid-operated shut-off valve 140 are constructed as a unit, as indicated in FIG. 1 by a square block of one-dot chain line, so that the required number of components and the overall size of the unit are reduced.

The second shut-off valve 140 is provided in a housing 200. As well known in the art, the second shut-off valve 140 includes a solenoid 202, and a drive member 204 in the form of a rod extending through the solenoid 202 in concentric relation with the solenoid 202. The drive member 204 is supported by a stationary support member 206 in the form of a sleeve, such that the drive member 204 is slidably movable in the longitudinal direction relative to the support member 206. The drive member 204 has a part-spherical upper end portion 208 (as seen in FIG. 6) which serves as a valve member, while a valve seat member 210 in the form of a sleeve is fixed concentrically to the support member 206. The valve seat member 210 has an annular valve seat 212 at its end opposite to the valve member (upper end portion) 208. The valve seat 212 cooperates with the valve member 208 to constitute a shut-off valve. The valve seat member 210 has a central communication passage 214 formed therethrough in the longitudinal direction. The communication passage 214 is open at the valve seat 212.

The housing 200 indicated above also has a passage 216 having a circular cross sectional shape for connecting the front wheel brake cylinder 22 and the rear wheel brake cylinder 26 (P valve 110). The valve seat member 210 is fixedly disposed in the passage 216 such that the valve seat member 210 is concentric with the passage 216 and such that there is left an annular gap between the valve seat member 210 and the circumferential surface of the passage 216. This annular gap functions as an annular passage 218 concentric with the central communication passage 214 formed through the valve seat member 210.

Within the annular passage 218, there are disposed a one-way sealing member in the form of a cup seal which serves as the second check valve 164, and a two-way sealing member in the form of an o-ring 220. The cup seal (second check valve) 164 and the o-ring 220 are arranged in the order of description in the direction from the front wheel brake cylinder 22 toward the rear wheel brake cylinder 26. These cup seal and o-ring 164, 220 divide the annular passage 218 into a first portion on the side of the front wheel brake cylinder 22, a second portion on the side of the rear wheel brake cylinder 26, and a third intermediate portion 222 between the first and second portions. The intermediate portion 222 is connected to the output or delivery end of the pump passage 148. The valve seat member 210 has a passage 224 for fluid communication between the communication passage 214 and the annular passage 218. In a portion of the communication passage 214 between the point of connection to the passage 224 and the end of the passage 214 on the side of the front wheel brake cylinder 22, there is disposed the first check valve 162 in the form of a check valve with a spring-biased ball 226. The ball 226 is normally held seated on a circular valve seat 230 (also formed on the valve seat member 210) under a biasing action of biasing means in the form of a spring 228.

In the pressure reducing valve device 160 constructed as described above, the first check valve 162 inhibits a flow of the brake fluid in the direction from the front wheel brake cylinder 22 toward the intermediate portion 222 of the annular passage 218. However, the second check valve 164 permits a flow of the brake fluid into the intermediate portion 222 with the opening pressure difference being substantially zero. Further, the first check valve 162 permits a flow of the brake fluid in the direction from the intermediate portion 222 toward the front wheel brake cylinder 22, when the pressure in the intermediate portion 222 is higher than the pressure in the front wheel brake cylinder 22 by more than a preset opening pressure difference of the first check valve 162. This opening pressure difference is determined by a biasing force of the spring 228. The second check valve 164 always inhibits a flow of the fluid from the intermediate portion 222 toward the front wheel brake cylinder 22. The flows of the fluid between the intermediate portion 222 and the rear wheel brake cylinder 26 are controlled by the second shut-off valve 140 only. IN FIG. 6, reference numeral 232 denotes a spring as biasing means for biasing the valve member 208 in the direction away from the valve seat 212.

The controller 170 is adapted to detect abnormality of the pressure reducing valve device 160 in an anti-lock braking mode of the braking system. The detection of abnormality of the valve device 160 is performed according to the principle which will be explained.

When the wheel braking pressure is not reduced, namely, when the wheel braking pressure is increased by operation of the pump 150 during an anti-lock pressure control operation, the distribution of the front and rear wheel braking forces is represented by the second basic distribution line and the distribution line of the P valve 110 for the full-load run, as indicated in the graph of FIG. 5. That is, the anti-lock control distribution line of the front and rear wheel braking forces is a combination of the second basic distribution line and the distribution line of the P valve 110 for the full-load run. This anti-lock control distribution line has a considerably small area in which the rear wheel braking force is larger than that according to the ideal distribution curve for the full-load run, but a relatively large area in which the rear wheel braking force is larger than that according to the ideal distribution curve for the minimum-load run. This means that when the wheel braking pressures are controlled according to the anti-lock control distribution line while the pressure reducing valve device 160 is normal, the operations to reduce the braking pressure in the rear wheel brake cylinder 22 are performed more frequently during the minimum-load run of the vehicle than during the full-load run.

However, the rear wheel braking force according to the anti-lock control distribution line is not always larger than that according to the ideal distribution curve for the minimum-load run. Therefore, the above-indicated higher frequency of the operations to reduce the rear wheel brake cylinder pressure during the minimum-load vehicle run is true when the actual front and rear wheel braking forces are smaller than the braking force value at the point of intersection between the anti-lock control distribution line and the ideal distribution curve for the minimum-load run. The front and rear wheel braking forces corresponding to the above intersection point may be represented by the depression force which acts on the brake pedal 14 or by the deceleration rate of the vehicle. Thus, it will be understood that the above higher frequency of the operations to reduce the rear wheel brake cylinder pressure during the minimum-load run is true only when the degree of braking applied to the vehicle is relatively small.

It is also noted that the operations to reduce the braking pressures in both of the front and rear wheel brake cylinders 22, 26 are frequently performed when the vehicle is running on a bad road surface (having a considerably low friction coefficient). This means that the accuracy of detection of abnormality of the pressure reducing valve 160 depending upon the frequency of the operations to reduce the rear wheel brake cylinder pressure is deteriorated during running of the vehicle on the bad road surface.

In view of the above findings, the controller 170 is adapted to check the pressure reducing valve device 160 for abnormality or defect during a predetermined abnormality monitoring period, on the basis of a number ratio $\gamma$ obtained by dividing the number of operations to reduce the braking pressure in the rear wheel brake cylinder 26 by the number of operations to reduce the braking pressure in the front wheel brake cylinder 22. The abnormality monitoring period is a period during which the vehicle is running on a good road surface (having a relatively high friction coefficient) and during which the degree of braking applied to the vehicle is smaller than a predetermined threshold. If the number ratio $\gamma$ is not larger than a predetermined reference value $\theta o$, it means that the number of the operations to reduce the pressure in the rear wheel brake cylinder 26 is abnormally small, and that there is a high probability that the pressure reducing valve device 160 is not normal. In the present embodiment, the abnormality detection of the pressure reducing valve device 160 is effected irrespective of whether the vehicle is in the minimum-load run or not. However, the abnormality detection may be effected only when the vehicle is in the minimum-load run or when a load (passenger load or cargo load) acting on the vehicle is smaller than a predetermined threshold.

The number of the operations to reduce the braking pressure in the rear wheel brake cylinder 26 is a sum of the number of operations to reduce the braking pressures in the front and rear wheel brake cylinders 22, 26 according to the commands to reduce the front wheel braking pressure, and the number of operations to reduce only the braking pressure in the rear wheel brake cylinder 26 according to the commands to reduce the rear wheel braking pressure. The number of the operations to reduce the braking pressure in the front wheel brake cylinder 22 is the number of operations to reduce the braking pressures in the front and rear wheel brake cylinders 22, 26 according to the commands to reduce the front wheel braking pressure.

The reference value θo is larger than one (1), and selected within a range between 1.2 and 1.5, for example. If the pressure reducing valve 160 is abnormal, the pressure in the rear wheel brake cylinder 26 cannot be increased as needed, whereby the actual rear wheel braking force does not exceed the value according to the ideal distribution curve (for the minimum-load run or full-load run) as indicated in the graph of FIG. 5. In this instance, therefore, the rear wheel will not have a locking tendency while the front wheel will have a locking tendency. Accordingly, the commands to reduce the pressure in the rear wheel brake cylinder 26 would not be generated, and the number of the operations to reduce the rear wheel brake cylinder pressure would be equal to the number of the operations to reduce the front wheel brake cylinder pressure, that is, the number ratio γ would be equal to 1. For this reason, the reference value γo is set to be larger than 1.

Figure 7:
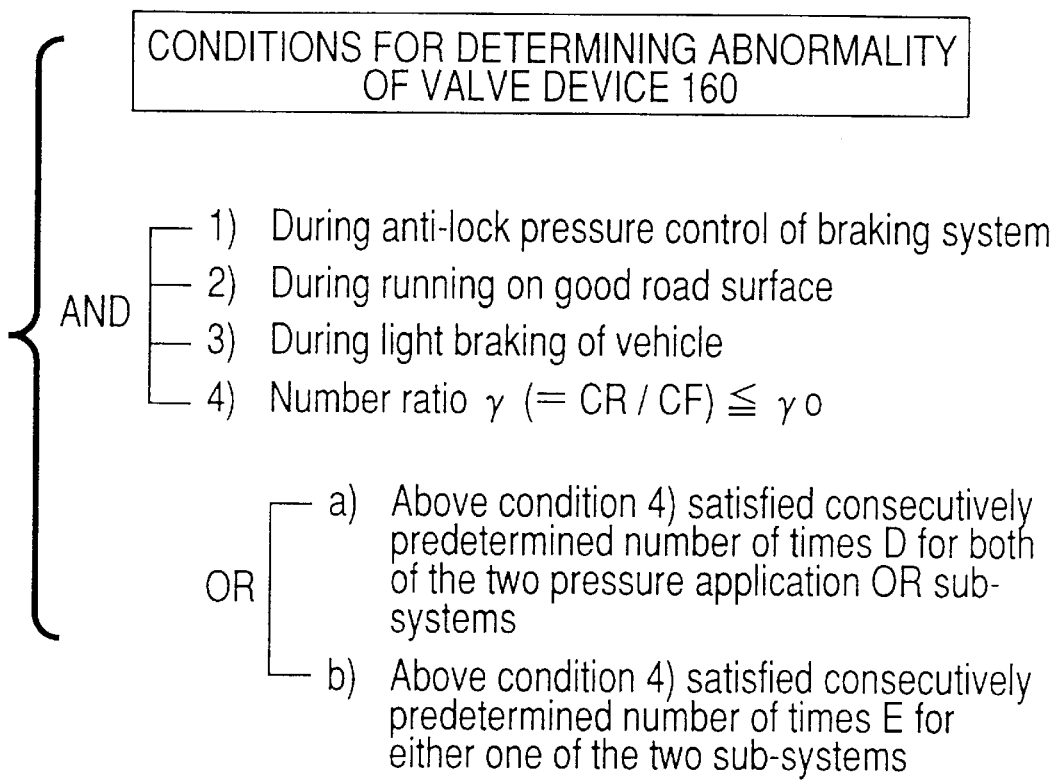
FIG. 7 is a view showing conditions in which a controller of the braking system of FIG. 1 determines the presence of abnormality of the pressure reducing valve device.

The controller 170 will not automatically determine the presence of abnormality of the pressure reducing valve device 160 as soon as it has determined that the number ratio γ is not larger than the predetermined reference value γo. The controller 170 is adapted to eventually determine the presence of abnormality of a pressure reducing valve device (valve devices 160 of the two pressure application sub-systems) of the braking system, when it is confirmed the determination that the number ratio γ is not larger than the reference value γo has been made a predetermined number of times D consecutively for both of the two pressure application sub-systems of the braking system, or a predetermined number of times E consecutively for either one of the two sub-systems. The predetermined number E is determined to be larger than the number D. FIG. 7 indicates the conditions for monitoring or diagnosing the valve devices 160 for abnormality and the conditions for determining the presence of the abnormality.

Possible causes for the abnormal functioning of the pressure reducing valve device 160 include: defect of the first check valve 162; defect of the second check valve 164; defect of the pump 150; and defect of check valves (not shown) provided on the suction and delivery sides of the pump 150. However, the present embodiment is designed to determine that the valve device 160 is abnormal if the number of operations to reduce the pressure in the rear wheel brake cylinder 26 is abnormally small.

Figure 8:
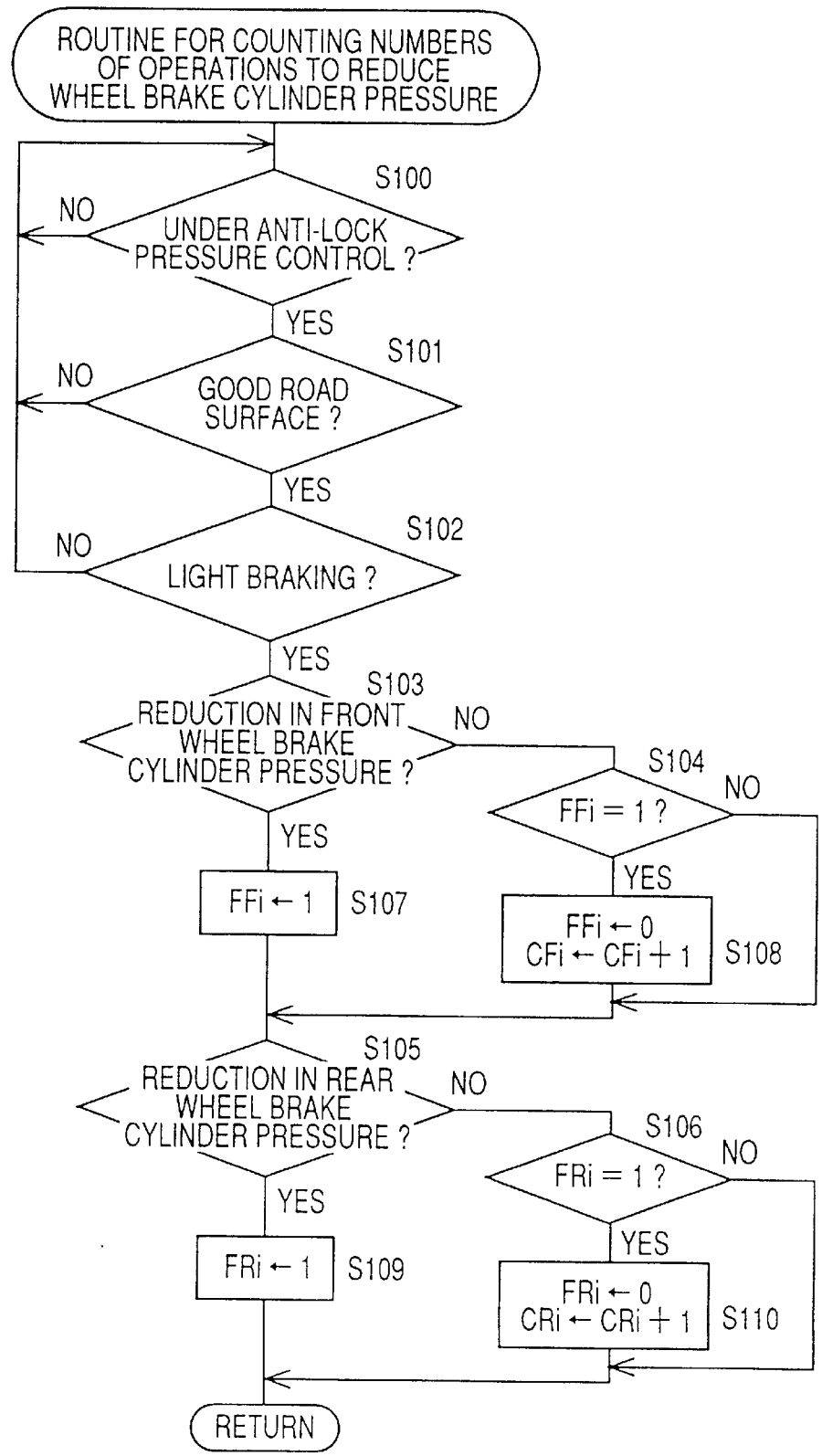
FIG. 8 is a flow chart illustrating a routine executed by a computer of the controller for counting the numbers of operations to reduce the wheel brake cylinder pressures.
Figure 9:
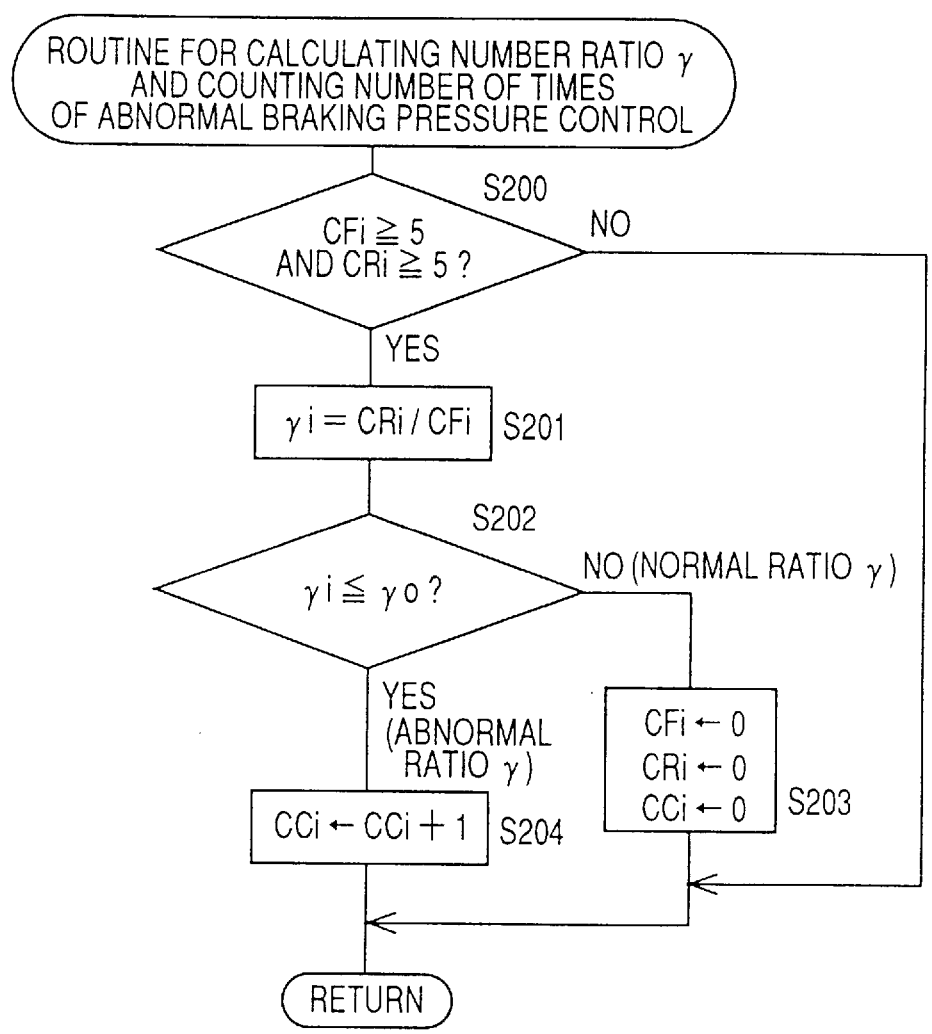
FIG. 9 is a flow chart illustrating a routine executed by the computer for obtaining number ratio of the numbers obtained in the routine of FIG. 8, and counting the number of times of abnormal braking pressure control in which the number ratio is excessively low.
Figure 10:
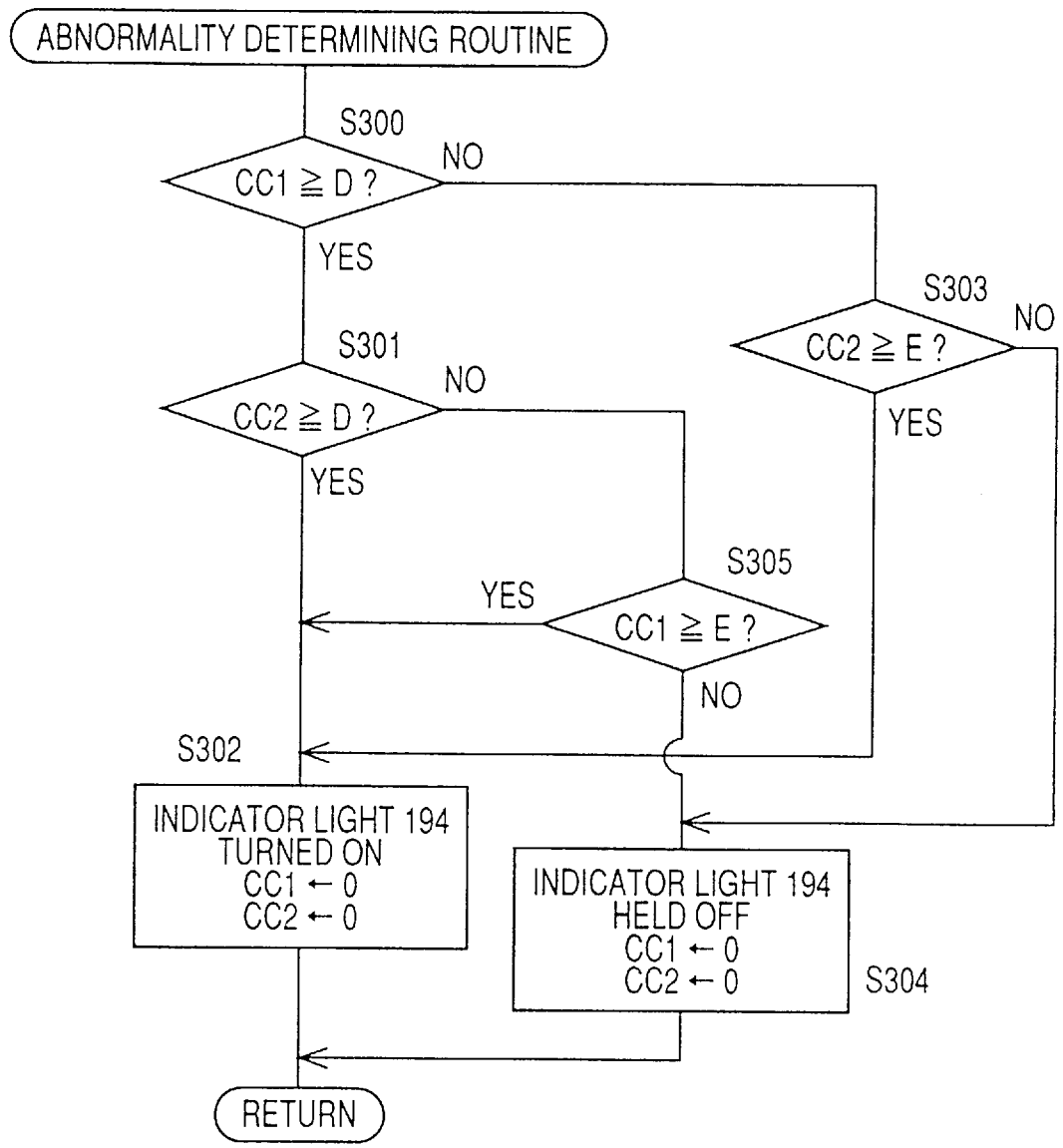
FIG. 10 is a flow chart illustrating an abnormality determining routine executed by the computer.

To diagnose the valve device 160 for abnormality, the ROM of the computer of the controller 170 stores control programs for executing: a routine illustrated in the flow chart of FIG. 8, for counting the numbers of operations to reduce the pressures in the front and rear wheel brake cylinders 22, 26; a routine illustrated in the flow chart of FIG. 9, for calculating the number ratio γ and counting the number of times of abnormal braking pressure control in which the number ratio q is not larger than the predetermined reference value γo; and a routine illustrated in the flow chart of FIG. 10, for determining the presence of abnormality of the pressure reducing valve device of the two pressure application sub-systems of the braking system of the X-crossing type.

The routine of FIG. 8 is executed at a predetermined cycle time for each of the two pressure application sub-systems. The routine is initiated with step S100 to determine whether the braking system is in the anti-lock pressure control or braking mode. If the braking system is brought to the anti-lock pressure control operation following a normal braking operation, an affirmative decision (YES) is obtained in step S100, and the control flow goes to step S100 to determine whether the vehicle is running on a good road surface. This determination is effected based on chronological changes in the output signals of the wheel speed sensors 172, 174. If the vehicle is running on a bad or poor road surface, a negative decision (NO) is obtained in step S101, and the control goes back to step S100. If the road surface is good, an affirmative decision (YES) is obtained in step S101, and the control flow goes to step S102.

In step S102, the controller 170 determines whether light braking is applied to the vehicle. This determination is made depending upon whether deceleration value G of the vehicle due to the braking is lower than a predetermined value Go. The deceleration value G may be obtained by differentiating a running speed of the vehicle which is estimated on the basis of the speeds of the four wheels detected by the wheel speed sensors 172, 174. Alternatively, the deceleration value G may be directly measured by an acceleration sensor.

If a negative decision (NO) is obtained in step S102, the control goes back to step S100. If an affirmative decision (YES) is obtained in step S102, it means that the predetermined abnormality monitoring period has just started or that the first three conditions 1), 2) and 3) indicated in FIG. 7 for diagnosing the valve device 160 for abnormality have been satisfied. In this case, the control flow goes to step S103 to determine whether the pressure in the front wheel brake cylinder 22 of the pressure application sub-system in question is being reduced, more specifically, whether the seventh pressure control mode in TABLE 1 is currently selected. If a negative decision (NO) is obtained in step S103, the control flow goes to step S104 to determine whether a flag FFi (i=1or 2) is set at "1". The flag FF1 is used for one of the two pressure application sub-systems while the flag FF2 is used for the other sub-system. The flag FFi is held to be "1" as long as the pressure in the front wheel brake cylinder 22 is continuously reduced, and is reset to "0" when the reduction of the pressure in the front wheel brake cylinder 22 is terminated. The flag FFi is provided in the RAM of the computer of the controller 170, and is reset to "0" upon initialization of the computer. As is apparent from the following description, the flag FFi is provided to increment a counter CFi each time an operation to reduce the pressure in the front wheel brake cylinder 22 is performed. If the flag FFi is set at "0", a negative decision (NO) is obtained in step S104, and step S105 is then implemented.

Step S105 is provided to determine whether the pressure in the rear wheel brake cylinder 26 of the pressure application sub-system in question is being reduced, more specifically, whether any one of the third, sixth or seventh pressure control modes in TABLE 1 is currently selected. If none of these pressure control modes is currently selected, a negative decision (NO) is obtained in step S105, and the control flow goes to step S106 to determine whether a flag FRi is set at "1". This flag FRi is provided to increment a counter CRi each time an operation to reduce the pressure in the rear wheel brake cylinder 26 is performed. If the flag FRi is set at "0", a negative decision (NO) is obtained in step S106, and one cycle of execution of the routine of FIG. 8 is terminated.

When an operation to reduce the pressure in the front wheel brake cylinder 22 has started, an affirmative decision (YES) is obtained in step S103, and step S107 is then implemented to set the flag FFi to "1". When the operation to reduce the pressure in the front wheel brake cylinder 22 has been terminated, the negative decision (NO) is obtained in step S103, and an affirmative decision (YES) is obtained in step S104, whereby the control flow goes to step S108 in which the flag FFi is reset to "0" and the counter CFi is incremented.

Thus, the number of operations to reduce the pressure in the front wheel brake cylinder 22 is counted by the counter CFi. Similarly, the number of operations to reduce the pressure in the rear wheel brake cylinder 26 is counted by the counter CRi which is incremented in step S110 each time an affirmative decision (YES) is obtained in step S106.

The routine of FIG. 9 is also executed at a predetermined cycle time for each of the two sub-systems of the X-crossing type. The routine is initiated with step S200 to determine whether the content of the counters CFi and CRi for the sub-system in question are equal to "5" or larger. If a negative decision (NO) is obtained in step S200, one cycle of execution of the routine of FIG. 9 is terminated.

When an affirmative decision (YES) is obtained in step S200 during repeated execution of the routine of FIG. 9 as a result of repeated execution of the routine of FIG. 8, the control flow goes to step S201 to calculate the number ratio $\gamma i$ by dividing the content of the counter CRi by the content of the counter CFi. Step S201 is followed by step S202 to determine whether the calculated number ratio $\gamma i$ is equal to or smaller than the predetermined reference value $\gamma o$, namely, whether the number of operations to reduce the pressure in the rear wheel brake cylinder 26 as represented by the content of the counter CRi is abnormally small. If the number ratio $\gamma i$ is larger than the reference value $\gamma o$, a negative decision (NO) is obtained in step S202, and the control flow goes to step S203 in which the counters CFi and CRi and a counter CCi (which will be described) are reset to "0", for repeated execution of the routines of FIGS. 8 and 9.

If the number ratio $\gamma i$ is equal to or smaller than the reference value $\gamma o$, an affirmative decision (YES) is obtained in step S202, and the control flow goes to step S204 to increment the counter CCi, and one cycle of execution of the routine of FIG. 9 is terminated. The counter CCi is provided to count the number of the affirmative decisions obtained in step S202, that is, the number of times of abnormal braking pressure control in which the number ratio $\gamma i$ is not larger than the reference value $\gamma o$. The contents of the counters CC1 and CC2 for the two pressure application sub-systems of the braking system of the X-crossing type are stored in the RAM of the computer of the controller 170.

The abnormality determining routine of FIG. 10 is initiated with step S300 to read the content of the counter CC1 for the first pressure application sub-system, and determine whether the content of this counter CC1 is equal to or larger than a predetermined threshold value D. If an affirmative decision (YES) is obtained in step S300, the control flow goes to step S301 to read the content of the counter CC2 for the second pressure application sub-system, and determine whether the content of this counter CC2 is equal to or larger than the predetermined threshold value D. If an affirmative decision (YES) is obtained in step S301, that is, if the contents of the two counters CC1 and CC2 are both equal to or larger than the predetermined threshold value D, it means that the pressure reducing valve devices 160 are considered to be abnormal. In this case, the control flow goes to step S302 to turn on the alarm indicator light 194, informing the vehicle operator of the presence of any abnormality of the pressure reducing valve devices 160 of the anti-lock braking system. In step S302, the counters CC1 and CC2 are reset to "0".

If a negative decision (NO) is obtained in step S300, the control flow goes to step S303 to determine whether the content of the counter CC2 for the second pressure application sub-system is equal to or larger than a predetermined second threshold value E which is larger than the predetermined first threshold value D. If an affirmative decision (YES) is obtained in step S303, the control flow goes to step S302 to turn on the indicator light 194. If the content of the counter CC1 is equal to or larger than the predetermined threshold value D while the content of the counter CC2 is smaller than the threshold value D, the affirmative and negative decisions are obtained in steps S300 and S301, respectively. In this case, step S305 is implemented to determine whether the content of the counter CC1 is equal to or larger than the predetermined second threshold value E. If an affirmative decision (YES) is obtained in step S305, step S302 is implemented to turn on the indicator light 194. Thus, the indicator light 194 is turned on if the contents of the two counters CC1 and CC2 are both equal to or larger than the predetermined threshold value D, or if one of the contents of the counters CC1, CC2 is increased to the predetermined second threshold value E. The second threshold value E is determined to be larger than the first threshold value D so that the accuracy of the determination of the presence of abnormality of the pressure reducing valve device 160 of each pressure application sub-system on the basis of only the content of the appropriate one of the two counters CC1, CC2 is improved to a level comparable to the accuracy of the determination of the presence of abnormality of the pressure reducing valve devices 160 of the braking system on the basis of the contents of the two counters CC1, CC2.

If either one of the contents of the two counters CCi is smaller than the first threshold value D and if the content of the other counter CCi is smaller than the second threshold value E, a negative decision (NO) is obtained in step S303 or S305, and the control flow goes to step S304 to hold the indicator light 194 in the off state.

It will be understood from the foregoing description of the present embodiment that a portion of the controller 170 assigned to execute the routines of FIGS. 8, 9 and 10 constitutes diagnosing means for determining whether the pressure reducing valve device 160 is abnormal, and that steps S100-S102 correspond means for enabling the diagnosing means to operate when the vehicle is running on a good road surface with relatively light braking in the anti-lock braking mode.

Figure 12:
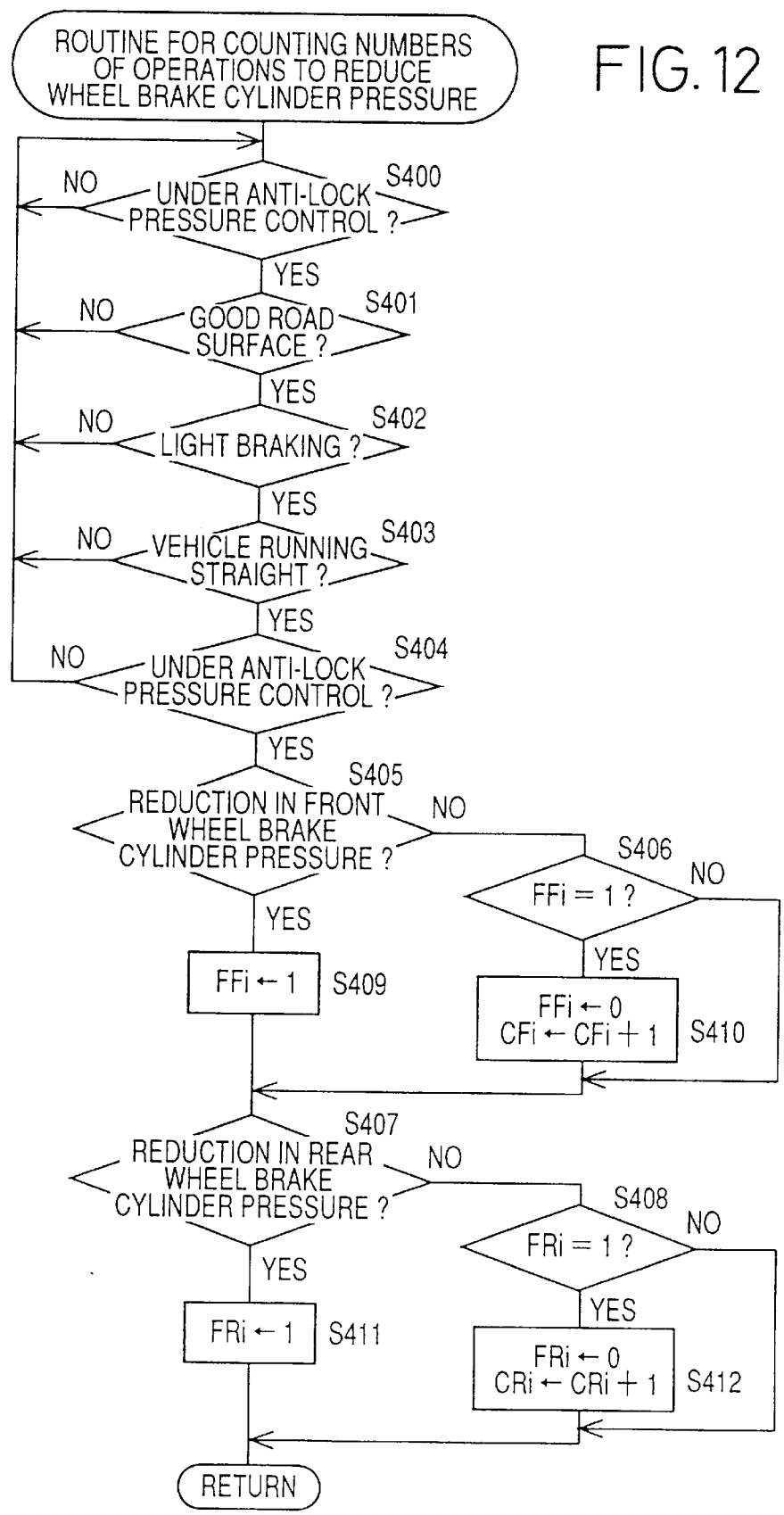
FIG. 12 is a flow chart illustrating a routine corresponding to that of FIG. 8, which is executed by a computer of the controller in the embodiment of FIG. 11.
Figure 13:
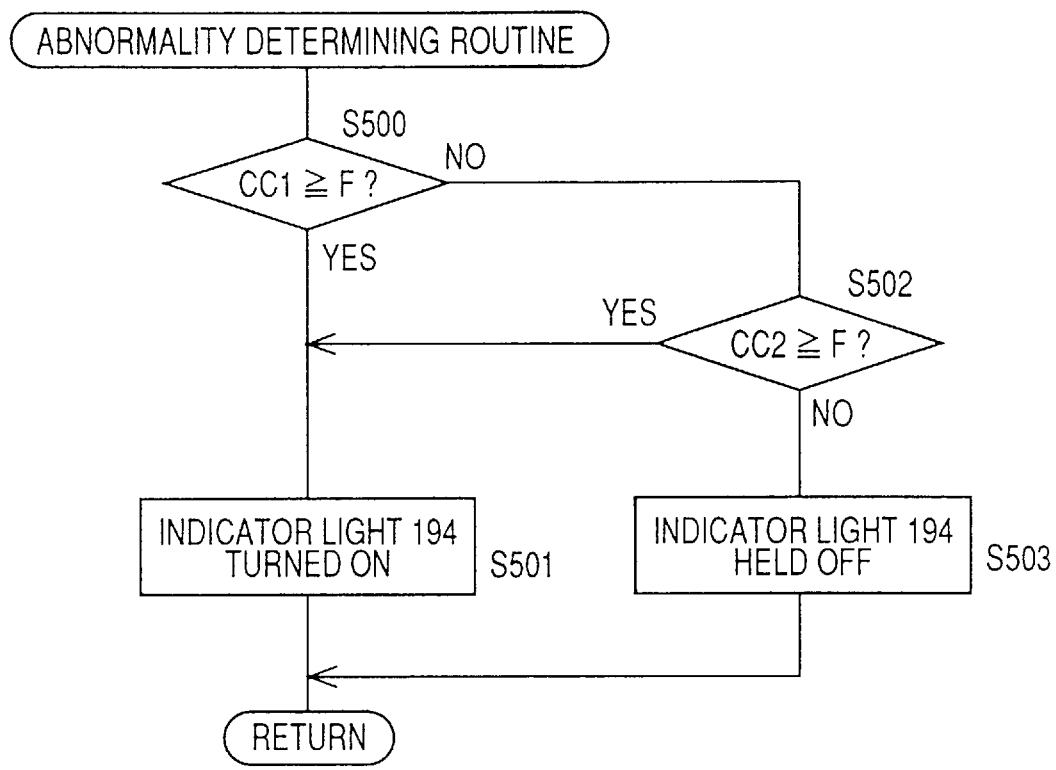
FIG. 13 is a flow chart illustrating an abnormality determining routine in the embodiment of FIG. 11.

Referring next to FIGS. 11–13, a second embodiment of the present invention will be described. The present second embodiment is mechanically identical with the first embodiment, but is different from the first embodiment in the control programs stored in the controller 170.

In the present second embodiment, the diagnosis or monitoring of the pressure reducing valve device 160 of each pressure application sub-system of the braking system is initiated when five conditions 1) through 5) indicated in FIG. 11 are satisfied. This arrangement improves the accuracy of determination of the presence of abnormality of the pressure reducing valve device 160 on the basis of the content of the appropriate counter CCi. The present arrangement is based on a finding that although the number as represented by the content of the counter CRi for the rear wheel brake cylinder 26 is abnormally small when the pressure reducing valve device 160 is abnormal, this number tends to be small when the vehicle is running in the following conditions: a) The vehicle is running on an uneven friction-coefficient road surface having two areas which correspond to the right and left wheels of the vehicle and which have relatively high and low friction coefficients; and b) The vehicle is turning. In the former case a), the number counted by the counter CRi tends to be small if the rear wheel whose brake cylinder 26 belongs to the sub-system in question lies on one of the areas of the road surface which has the higher friction coefficient. In the latter case b), the number counted by the counter CRi tends to be small if the rear wheel whose brake cylinder 26 belongs to the sub-system in question is located on the outer side of a curve along which the vehicle is turning, that is, if the rear wheel in question has an increased load due to turning of the vehicle. Therefore, the determination as to whether the pressure reducing valve 160 is abnormal cannot be made with high accuracy or reliability, if the determination is made solely on the basis of the number counted by the counter CRi, irrespective of whether the vehicle is running straight or turning, and whether the vehicle is running on an even or uneven friction-coefficient road surface. In view of the above, the present second embodiment is adapted to count the number of operations to reduce the pressure in the rear wheel brake cylinder 26, only when the vehicle is running in the following conditions 1) through 5) as indicated in FIG. 11: 1) The braking system is in the anti-lock braking mode; 2) The vehicle is running on a good road surface; 3) The degree of braking currently applied is smaller than a predetermined upper limit; 4) The vehicle is running straight; and 5) The vehicle is running on an even friction-coefficient road surface.

The ROM of the controller 170 stores control programs for executing a routine of FIG. 12, the routine of FIG. 9 and a routine of FIG. 13.

The routine of FIG. 12 for counting the numbers of operations to reduce the pressure in the front and rear wheel brake cylinders 22, 26 is identical with the routine of FIG. 8, except for the addition of steps S403 and S404 in the routine of FIG. 12.

Step S403 is provided to determine whether the vehicle is running straight. This determination is effected on the basis of an output signal of a steering angle sensor adapted to detect an angle of operation of the steering wheel of the vehicle by the vehicle operator. Described in detail, an affirmative decision (YES) is obtained in step S403, namely, the controller 170 determines that the vehicle is running straight, if the steering angle of the steering wheel is held within a predetermined range whose upper and lower limits are close to the neutral position of the wheel. However, the determination in step S403 may be made otherwise, by using a senor for detecting a lateral acceleration value or yaw rate of the vehicle, for example.

Step S404 is provided to determine whether the road surface on which the vehicle is running has right and left areas which correspond to the right and left wheels and which have considerably different friction coefficient values. This determination is effected depending upon a difference between the contents of the counters CR1 and CR2 for the first and second pressure application sub-systems, more precisely, whether this difference is larger than a predetermined value. If the difference is larger than the predetermined value, the controller 170 determines that the vehicle is running on an uneven friction-coefficient road surface, and a negative decision (NO) is obtained in step S404. However, the determination in step S404 may be made otherwise. For instance, the road surface is determined to be an uneven friction-coefficient road surface if the lateral acceleration or yaw rate of the vehicle is higher than a predetermined value when the steering wheel is placed in its neutral position.

As in the first embodiment, the counter CCi is incremented each time the number ratio $\gamma i$ is equal to the predetermined reference $\gamma o$ or larger.

The abnormality determining routine of FIG. 13 is initiated with step S500 to read the content of the counter CC1 for the first pressure application sub-system, and determine whether the content of the counter CC1 is equal to or larger than a predetermined threshold value F. If an affirmative decision (YES) is obtained in step S500, the control flow goes to step S501 to turn on the alarm indicator light 194, informing the vehicle operator of the presence of any abnormality of the pressure reducing valve device 160. If a negative decision (NO) is obtained in step S500, the control flow goes to step S502 to read the content of the counter CC2 for the second pressure application sub-system and determine whether the content of the counter CC2 is equal to or larger than the threshold value F. If an affirmative decision (YES) is obtained in step S502, step S501 is implemented to turn on the indicator light 194. If both of the contents of the counters CC1 and CC2 are smaller than the threshold value F, the control flow goes to step S503 to hold the indicator light 197 in the off state. Thus, the pressure reducing valve device 160 of the anti-lock braking system is estimated to be abnormal, if the number as represented by the counter CCi for either one of the two pressure application sub-systems of the braking system is equal to or larger than the threshold value F.

It will be understood that the indicator light 194 is used, in the first and second embodiments, as alarming means for informing the vehicle operator of the presence of abnormality of the pressure reducing valve device 160. However, the alarming means may take other forms, for example, an audio alarm indicator such as a buzzer and a voice generator, or a visual alarm indicator such as a liquid crystal display.

Although the number ratio $\gamma i$ is obtained in step S201 and compared with the reference value $\gamma o$ in step S202, the number ratio may be replaced by a difference (CRi − CFi), which is compared with a predetermined reference value in step S202.

Figure 14:
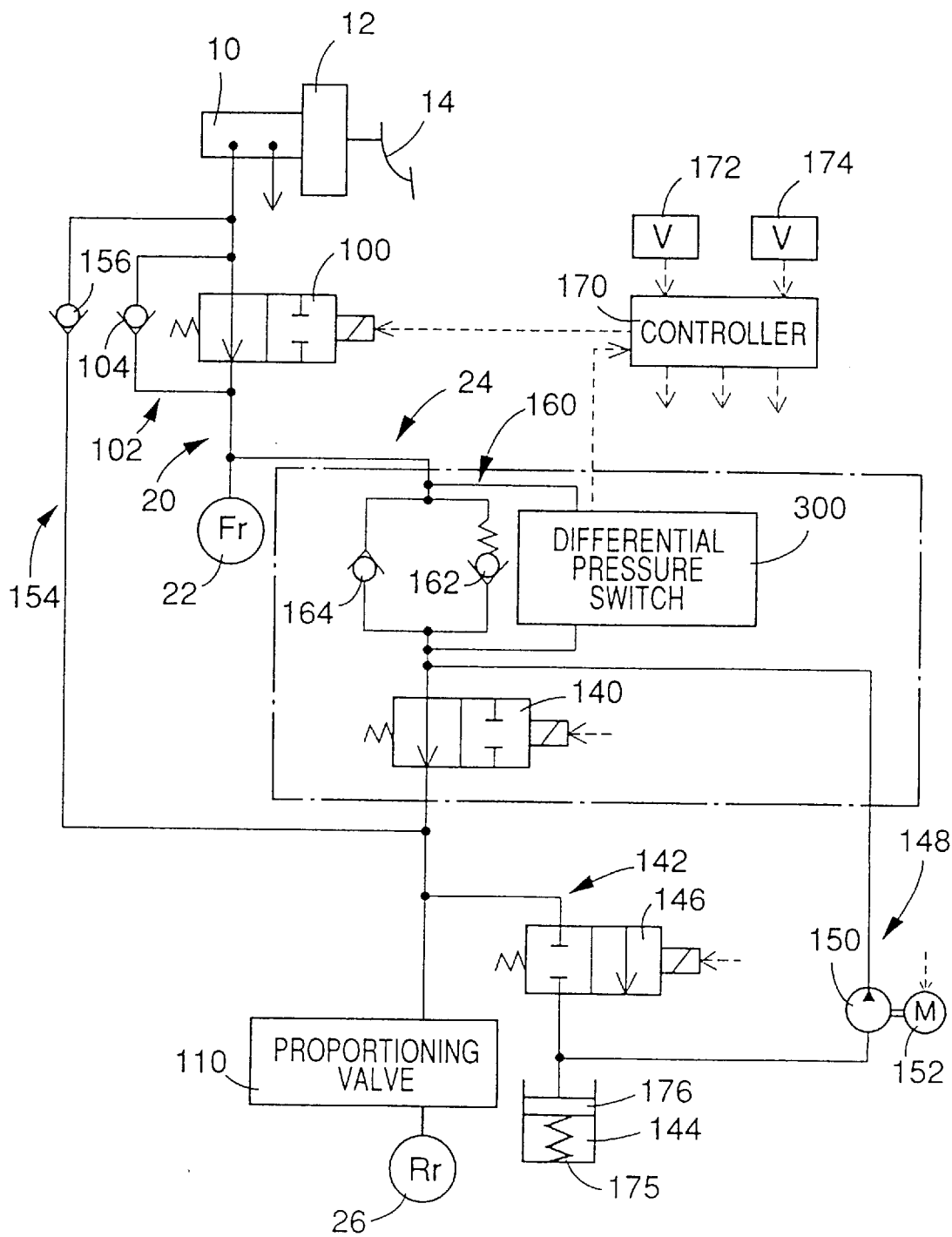
FIG. 14 is a schematic view illustrating an anti-lock braking system constructed according to a third embodiment of this invention.

Referring to FIGS. 14–18, there will be described an anti-lock braking system constructed according to a third embodiment of the present invention. Unlike the braking system according to the first and second embodiments, the braking system according to this third embodiment is provided with a differential pressure switch 300 as shown in FIG. 14. The differential pressure switch 300 is used to monitor or diagnose the pressure reducing valve device 160 for abnormality. In this respect, it is noted that as long as the pressure reducing valve device 160 is normal, there exists a certain pressure difference across the pressure reducing valve device 160, when the braking system is placed in a predetermined condition. The pressure difference across the valve device 160 is interpreted to mean a difference between the pressures on the opposite sides of the valve device 160, namely, between the pressure (hereinafter referred to as "front cylinder side pressure") on the side of the front wheel brake cylinder 22 and the pressure (hereinafter referred to as "pump side pressure") on the side of the pump 150. Therefore, if no pressure difference is present across the pressure reducing valve device 160, it is considered that the valve device 160 is not normally functioning. The output of the differential pressure switch 300 is used to check if the pressure difference is present across the pressure reducing valve device 160.

The present third embodiment is adapted to determine that the pressure reducing valve device 160 is abnormal, if no pressure difference is present across the valve device 160, although the absence of the pressure difference across the valve device 160 may be caused due to abnormality of the pump 150 or abnormality of check valves provided on the suction and delivery sides of the pump 150, as well as abnormality of the first and second check valves 162, 164.

Figure 16:
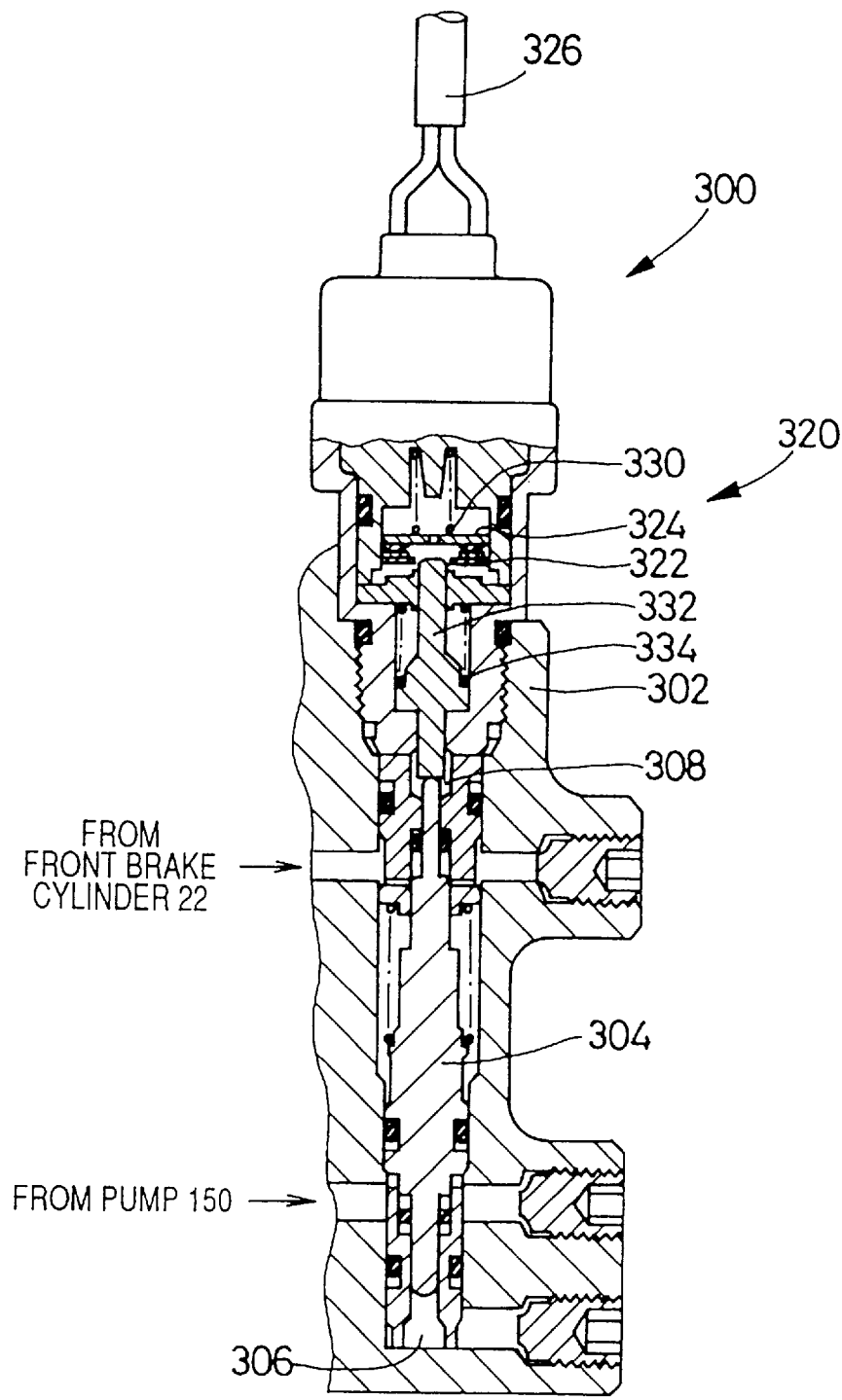
FIG. 16 is a front elevational view partly in cross section of a pressure differential switch used in the embodiment of FIG. 14.

As shown in FIG. 14, the differential pressure switch 300 is disposed in parallel connection with the pressure reducing valve device 160, so as to receive the front cylinder side pressure and the pump side pressure of the valve device 160. As shown in FIG. 16, the differential pressure switch 300 has a cylindrical housing 302, and a differential pressure piston 304 which is substantially fluid-tightly and slidably received in a bore formed in the housing 302. The differential pressure piston 304 has two pressure-receiving surfaces which have the same area and which receive respectively the front cylinder side pressure and the pump side pressure, such that these pressures act on the piston 304 in the opposite directions. In FIG. 16, reference numerals 306 and 308 denote atmospheric pressure chambers. The differential pressure switch 300 includes a switch portion 320 which has a stationary contact 322 and a movable contact 324. The stationary contact 322 has two terminals (not shown) to which respective wires 326 are connected. The movable contact 324 is normally held in contact with the stationary contact 322 under a biasing action of biasing means in the form of a spring 330. A displacement of the differential pressure piston 304 is transmitted to the movable contact 324 through a plunger 332. When the pump side pressure is higher than the front cylinder side pressure, the piston 304 is advanced (moved in the upward direction as seen in FIG. 16), whereby the plunger 332 is advanced by the piston 304 against the biasing action of the spring 334. As a result the movable contact 324 is moved away from the stationary contact 322. Thus, the differential pressure switch 300 is closed or in the ON state with the movable contact 324 held in contact with the stationary contact 322, when the pump side pressure is equal to the front cylinder side pressure, and is open or in the OFF state with the movable contact 324 spaced apart from the stationary contact 322, when the pump side pressure is higher than the front cylinder side pressure.

The differential pressure switch 300 is connected to the controller 170 through the wires 326. The ROM of the computer of the controller 170 stores an abnormality determining routine as illustrated in the flow chart of FIG. 15, wherein the output signal of the switch 300 is used to determine whether there exists a pressure difference across the valve device 160 when the braking system is placed in the predetermined condition.

Figure 15:
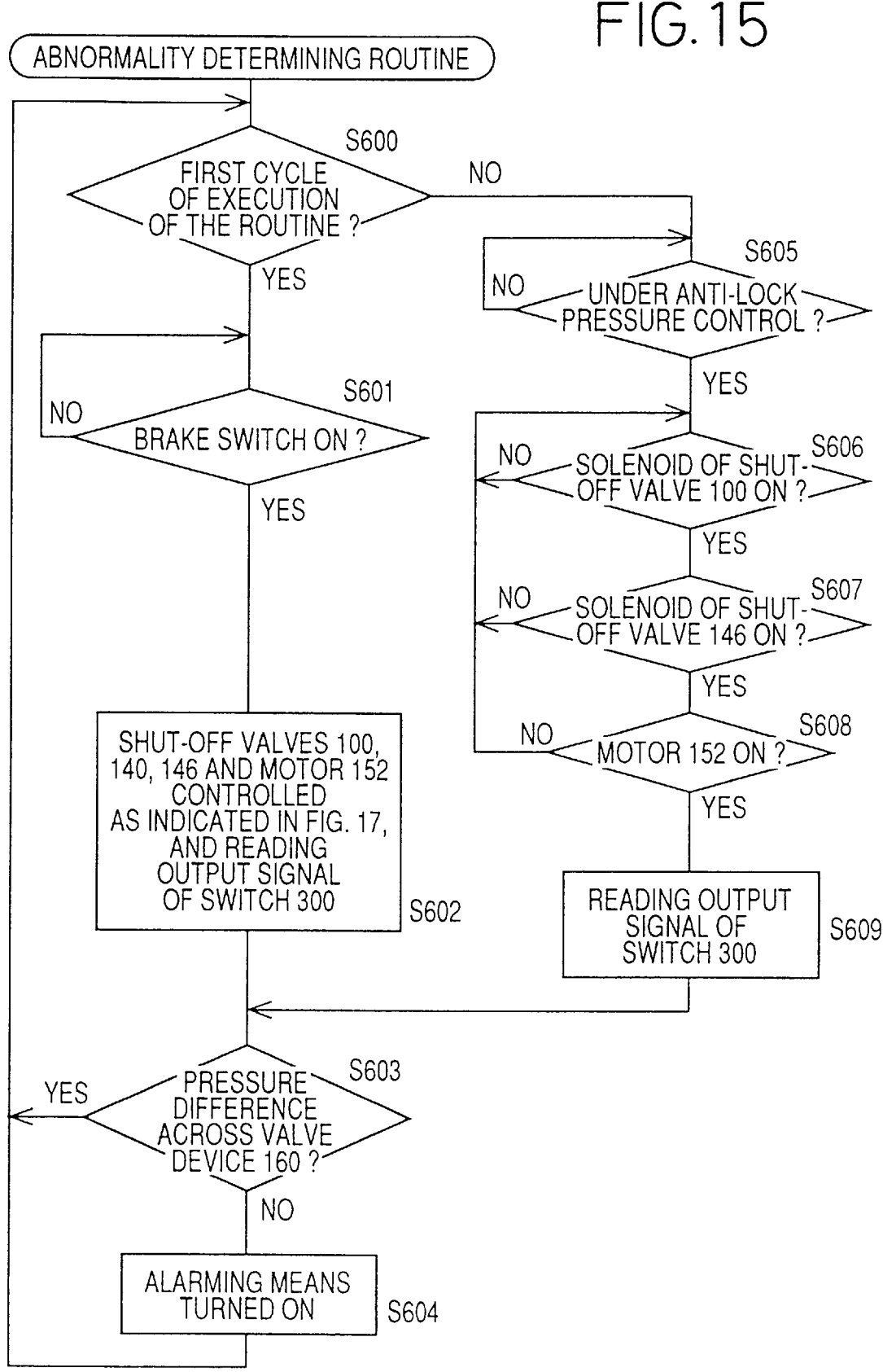
FIG. 15 is a flow chart illustrating a routine executed by a computer of a controller of the braking system of FIG. 14 for determining the presence of abnormality of a pressure reducing valve device provided in the braking system.

The abnormality determining routine of FIG. 15 is executed to diagnose the pressure reducing valve device 160 immediately after an ignition switch of the vehicle is turned on, and during an anti-lock pressure control operation of the braking system. In the initial diagnosis immediately after the ignition switch is turned on, the anti-lock pressure control operation is simulated by controlling the shut-off valves 100, 140, 146 according to a predetermined pattern, and the valve device 160 is checked for abnormality on the basis of the output signal of the differential pressure switch 300. In the diagnosis during the actual anti-lock pressure control operation, the valve device 160 is checked for abnormality on the basis of the output signal of the switch 300, when the shut-off valves 100, 140, 146 are placed in the predetermined positions.

The routine of FIG. 15 is initiated with step S600 to determine whether the present cycle of execution of this routine is the first cycle after the ignition switch of the vehicle is turned on. If the routine is executed for the first time, an affirmative decision (YES) is obtained in step S600, and the control flow goes to step S601 to determine whether the brake pedal 14 is depressed. This determination in step S601 is effected on the basis of an output signal of a brake switch adapted to detect an operation of the brake pedal 14 by the vehicle operator. To permit an initial diagnosis of the check the valve device 160 on the basis of the pressure difference across the first check valve 162 immediately after the ignition switch is turned on, the pressurized fluid should be delivered from the pump 150 to the valve device 160. To this end, the fluid should be present in the reservoir 144, namely, the fluid should be fed from the master cylinder 10 into the reservoir 144. For this purpose, the master cylinder 10 should be actuated by operation of the brake pedal 14 by the vehicle operator before the valve device 160 is initially checked for abnormality.

If an affirmative decision (YES) is obtained in step S601, the control flow goes to step S602 in which the first, second and third shut-off valves 100, 140, 146 and the motor 152 for the pump 150 are controlled as indicated in the time chart of FIG. 17. Namely, the first shut-off valve 100 is first closed with its solenoid energized, and then the third shut-off valve 146 is opened with its solenoid energized to feed the brake fluid from the master cylinder 10 to the reservoir 144 while at the same time the motor 152 is turned on to operate the pump 150, as indicated in the time chart of FIG. 17. The third shut-off valve 146 is closed with its solenoid being de-energized a predetermined time after the energization. Then, the second shut-off valve 140 is closed with its solenoid energized. Consequently, the pressure of the fluid sucked up and pressurized by the pump 150 in operation is applied to the first check valve 162 of the valve device 160. If the first check valve 162 is normal, there should exist a pressure difference across the first check valve 162, and the differential pressure switch 300 should be in the OFF state. If the first check valve 162 is abnormal, no pressure difference should exist across the first check valve 162, and the switch 300 should be in the ON state. Therefore, it is possible to determine the presence or absence of abnormality of the valve device 160 (first check valve 162) on the basis of the output signal of the switch 300, during a predetermined abnormality monitoring period indicated in FIG. 17, that is, while the shut-off valves 100, 140, 146 are closed with the motor 152 held in operation. In step S602, the output signal of the differential pressure switch 300 is stored in the RAM of the controller 170, and then the second and first shut-off valves 140, 100 are opened in this order, and the motor 152 is turned off to bring the braking system to the condition prior to the implementation of step S602

Step S602 is followed by step S603 to determine whether a pressure difference is present across the valve device 160, depending upon whether the differential pressure switch 300 is in the OFF state. As indicated above, the valve device 160 is considered to be normal when the switch 300 is in the OFF state, and abnormal when the switch 300 is in the ON state. If an affirmative decision (YES) is obtained in step S603, the control flow returns to step S600. If a negative decision (NO) is obtained in step S603, the control flow goes to step S604 to turn on suitable alarming means to inform the vehicle operator of the presence of abnormality of the valve device 160. The alarming means may be an audio indicator such as a buzzer or a voice generator, or a visual indicator such as a liquid crystal display or an indicator light as provided in the first and second embodiments. Then, the control returns to step S600. It is noted that he present third embodiment is adapted such that the braking system is operated in the anti-lock manner, irrespective of whether abnormality of the valve device 160 has been detected or not.

Thus, the first cycle of execution of the routine of FIG. 15 is completed. In the second cycle of execution of this routine, a negative decision (NO) is obtained in step S600, and the control flow goes to step S605 to determine whether the braking system is in an anti-lock pressure control operation. If an affirmative decision (YES) is obtained in step S605, the control flow goes to steps S606 through S608 to determine whether the braking system is placed in a predetermined condition suitable for diagnosing the valve device 160 in the anti-lock braking or pressure control mode. This predetermined condition corresponds to an abnormality monitoring period indicated in the time chart of FIG. 18. Namely, step S606 is implemented to determine whether the first shut-off valve 100 is closed with it solenoid energized. Step S607 is then implemented to determine whether the third shut-off valve 146 is closed with its solenoid de-energized. Step S608 is then implemented to determine whether the motor 152 is in operation. If an affirmative decision (YES) is obtained in all of the above-indicated steps S605–S608, it means that the braking system is in the abnormality monitoring period. In this case, the control flow goes to step S609 to read the output signal of the differential pressure switch 300, and then to step S603 to determine whether the valve device 160 is normal or abnormal, depending upon the output signal of the switch 300.

It will be understood from the above description of the third embodiment that the differential pressure switch 300 and a portion of the controller 170 assigned to execute the routine of FIG. 15 constitute the abnormality determining means for determining the presence or absence of abnormality of the valve device 160. It will also be understood that the switch 300 constitutes a part of detecting means for detecting a pressure difference across the valve device 160, while the portion of the controller 170 assigned to execute the routine of FIG. 15 constitutes determining means for determining that the valve device 160 is abnormal, if the pressure difference is not detected by the detecting means.

Figure 19:
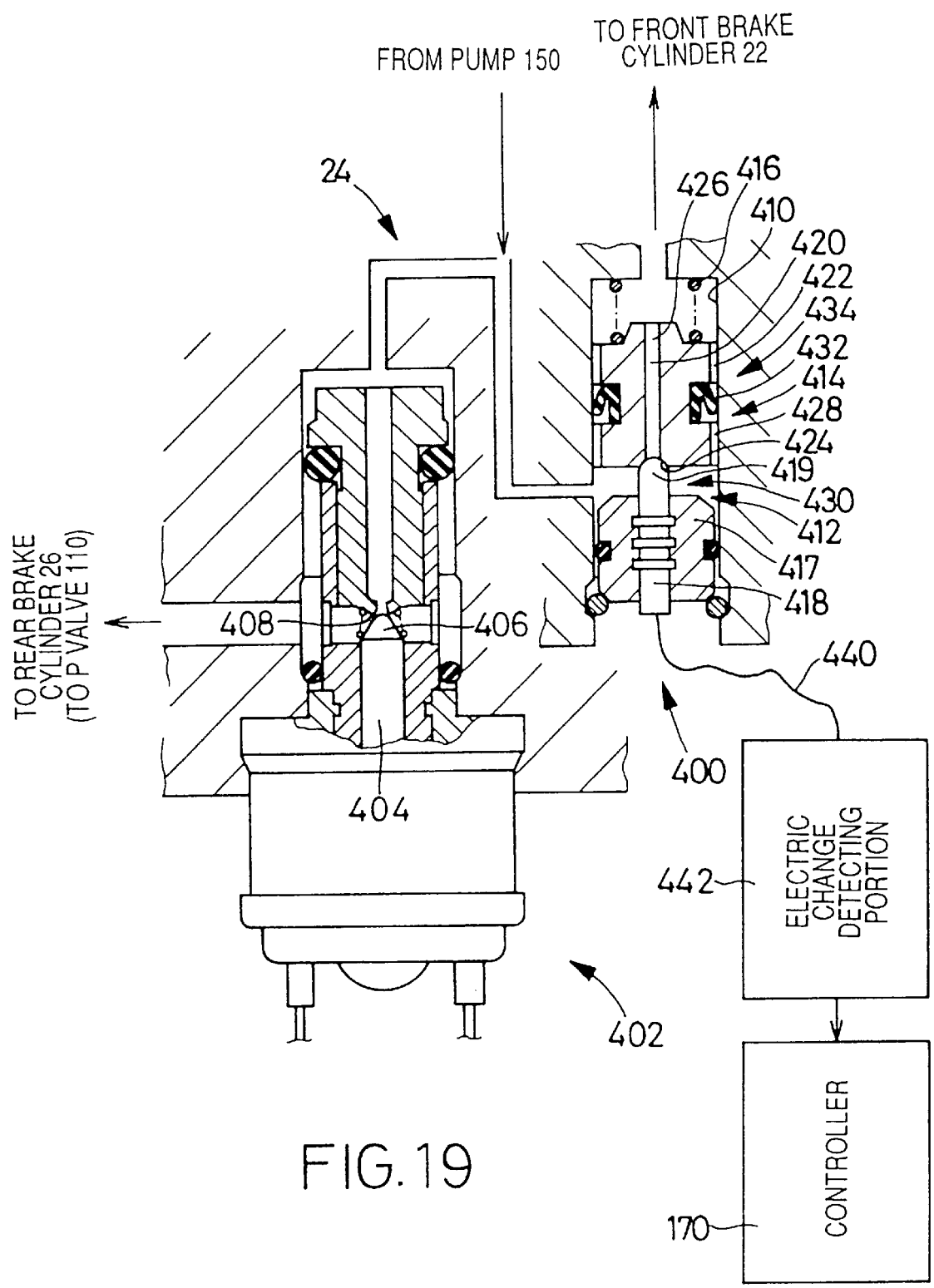
FIG. 19 is a front elevational view partly in cross section of a pressure reducing valve device and a second shut-off valve which are provided in an anti-lock braking system according to a fourth embodiment of the invention.

Referring to FIG. 19, there will be described a fourth embodiment of this invention.

While the third embodiment uses the exclusive differential pressure switch 300 to check the pressure reducing valve device 160 for abnormality by monitoring the pressure difference across the valve device 160, the fourth embodiment utilizes the first check valve of the pressure reducing valve device per se, to diagnose the valve device. Namely, the first check valve has a secondary function of diagnosing the valve device in addition to a primary function of reducing the pressure to be applied to the front wheel brake cylinder 22.

In the fourth embodiment illustrated in FIG. 19, a pressure reducing valve device 400 and a second shut-off valve 402 are provided in a portion of the rear brake cylinder passage 24 between the P valve 110 and the point of connection of the front and rear brake cylinder passages 20, 24. Like the second shut-off valve 140 shown in FIG. 6, the second shut-off valve 402 includes, as major components thereof, a drive member or plunger 404 displaced by a magnetic force generated by a solenoid coil, a valve member 406 formed at one end of the plunger 404, and a valve seat 408 on which the valve member 406 is seated when the shut-off valve 402 is closed.

The pressure reducing valve device 400 includes a support member 412 and a valve seat member 414 which are substantially fluid-tightly received in a cylinder bore 410 which constitutes a part of the rear brake cylinder passage 24. The support member 412 and valve seat member 414 are disposed concentrically with each other such that the valve seat member 414 is forced against the support member 412 under a biasing action of biasing means in the form of a spring 416.

The support member 412 has a non-conductive cylindrical body 417 made of a ceramic or plastic material, for example, and a conductive rod member 418 made of an electrically conductive material. The rod member 418 is substantially fluid-tightly fixed in a center bore formed through the cylindrical body 417 such that the rod member 418 is not axially movable relative to the cylindrical body 417. The rod member 418 has a semi-spherical valve member 419 at one end thereof. On the other hand, the valve seat member 414 has a central through-hole 420, and a plurality of axial grooves 422 formed in its outer circumferential surface such that the grooves 422 extend in the axial direction of the valve seat member 414. The valve seat member 414 has a valve seat 424 formed at one end face thereof opposite to the valve member 419. The through-hole 420 is open in the valve seat 424. Thus, the valve seat member 414 accommodated in the cylinder bore 410 provides an inner passage 426 corresponding to the through-hole 420, and cooperates with the cylinder bore 410 to define an outer passage 428 corresponding to the axial grooves 422. These inner and outer passages 426, 428 are concentric with and independent of each other and constitute a portion of the rear brake cylinder passage 24 which corresponds to the valve seat member 414.

The valve member 419, valve seat 424, inner passage 426 and spring 416 cooperate to constitute a first check valve 430, which permits a flow of the fluid in a direction from the pump 150 toward the front wheel brake cylinder 22 when the pump side pressure is higher than the front cylinder side pressure by more than a preset valve opening pressure difference which corresponds to a set load of the spring 416. The first check valve 430 inhibits a flow of the fluid in the reverse direction.

A one-way sealing member in the form of a cup seal 432 is fitted on an axially intermediate portion of the outer circumferential surface of the valve seat member 414. The cup seal 432 inhibits a flow of the fluid in a direction from the front wheel brake cylinder 22 toward the pump 150, and inhibits a flow of the fluid in the reverse direction. Thus, the cup seal 432 and the outer passage 428 constitute a second check valve 434 which permits a flow of the fluid in the direction from the front wheel brake cylinder 22 toward the pump 150 and inhibits a flow of the fluid in the reverse direction.

The electrically conductive rod member 418 is electrically connected by a wire 440 to an external detecting portion 442. The wire 440, rod member 418, valve seat member 414, a housing of the pressure reducing valve device 400, and a body of the vehicle are connected in series to each other so as to constitute an electric circuit which includes a stationary contact provided by the valve member 419 and a movable contact provided by the valve seat 424. The detecting portion 44 is adapted to detect a change of electrical continuity between the wire 440 and the vehicle body which functions as a ground, namely, between the valve member 419 and the valve seat 424, more specifically a chronological change in an electric current flowing between the valve member 419 and the valve seat 424.

The detecting portion 442 is connected to the controller 170, so that the controller 170 determines the presence or absence of abnormality of the pressure reducing valve device 400, on the basis of the output signal of the detecting portion 442. In the event that an electrically conductive foreign matter is caught between the valve member 419 and the valve seat 424 of the first check valve 430, electrical continuity is maintained between the valve member 419 and valve seat 424 in the presence of the electrically conductive foreign matter interposed therebetween. In the event that a foreign matter caught between the valve member 419 and valve seat 424 is not electrically conductive, the electrical continuity between these members is continuously prevented by the non-conductive foreign matter. In either of these cases, there cannot occur a change in the electrical continuity or electric current between the valve member 419 and the valve seat 424. Thus, the absence of such electrical change indicates abnormality of the pressure reducing valve device 400, i.e., abnormal presence of a foreign matter between the valve member 419 and the valve seat 424. Unlike the third embodiment which uses the pressure difference across the valve device 160 to diagnose the valve device 160, the present fourth embodiment uses the electrical change of the valve device 400 to diagnose the valve device 400.

It will be understood that the fourth embodiment is adapted such that the first check valve 430 per se functions as a switch to detect a foreign matter caught therein. This arrangement is effective to minimize an increase in the number of components necessary to diagnose the pressure reducing valve device 400, and a resulting increase in the size of the valve device.

Figure 20:
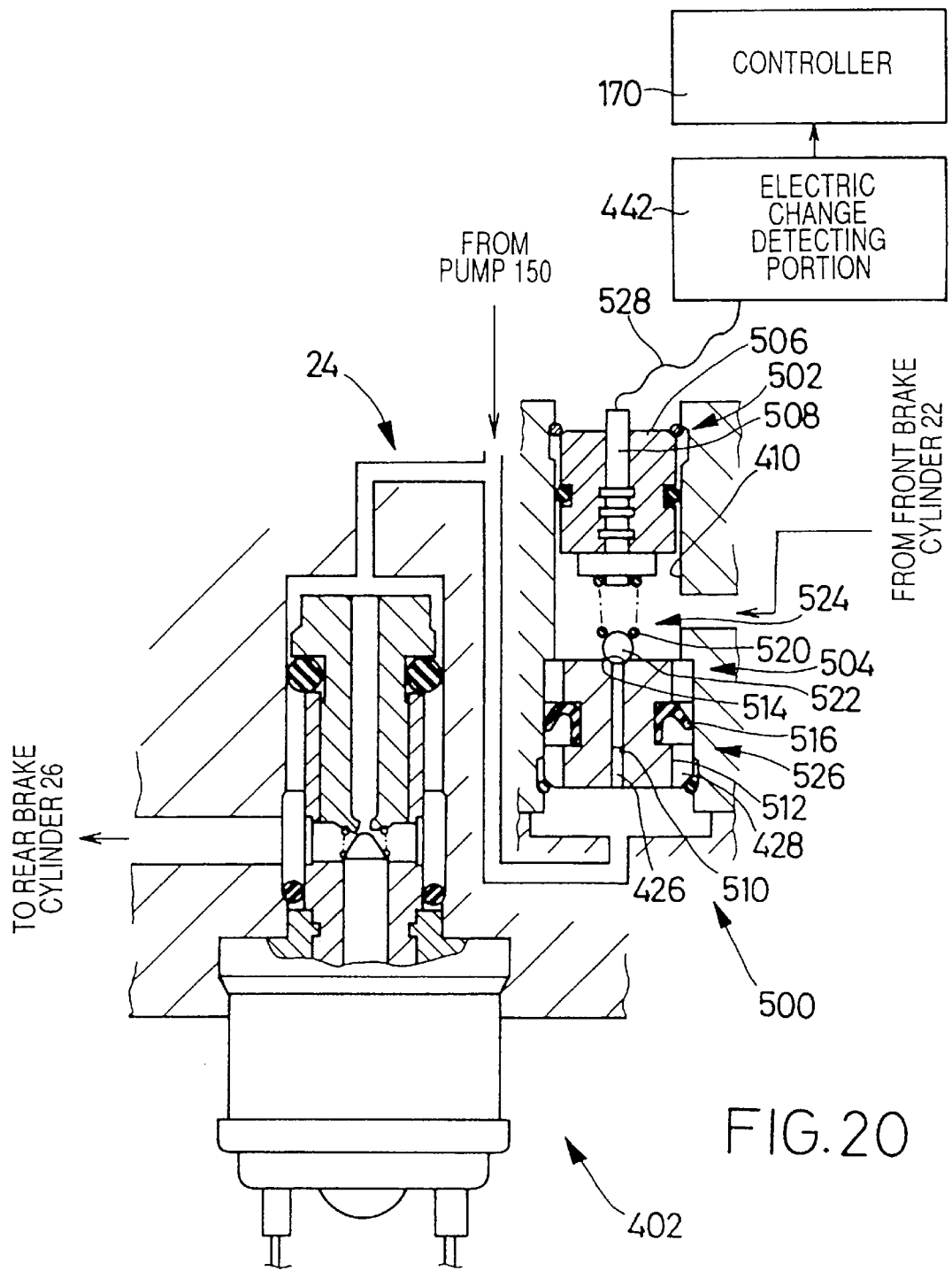
FIG. 20 is a view corresponding to that of FIG. 19, showing a yet fifth embodiment of the invention.

FIG. 20 shows a modification of the fourth embodiment of FIG. 19, which is also adapted to diagnose a pressure reducing valve device 500 on the basis of an electrical change of the valve device. In this fifth embodiment of FIG. 20, the reference numerals used in FIG. 19 will be used to identify the functionally corresponding components, which will not be described to avoid redundant explanation.

In the valve device 500, a retainer member 502 and a valve seat member 504 are substantially fluid-tightly received in the cylinder bore 410 which has been described with respect to the fourth embodiment by reference to FIG. 19. The retainer member 502 has a non-electrically conductive cylindrical body 506, and an electrically conductive retainer 508 which is substantially fluid-tightly fixed in a center bore formed through the cylindrical body 506 such that the retainer 508 is not axially movable relative to the cylindrical body 506. Like the valve seat member 414 shown in FIG. 19, the valve seat member 504 has a through-hole 510, axial grooves 512, a valve seat 514, and a cup seal 516. Thus, the valve seat member 404 accommodated in the cylinder bore 410 provides the inner passage 426 corresponding to the through-hole 510, and cooperates with the cylinder bore 410 to define the outer passage 428 corresponding to the axial grooves 512. These inner and outer passages 426, 428 are independent of each other and constitute a portion of the rear brake cylinder passage 24 which corresponds to the valve seat member 504. The retainer member 508 carries biasing means in the form of a spring 520, and a valve member in the form of a ball 522 is disposed between the valve seat 514 and the end of the spring 520 remote from the retainer 508, such that the ball 522 is held seated on the valve seat 514 under a biasing force of the spring 520. The spring 520 is made of an electrically conductive material.

In the present fifth embodiment, the valve member 522, valve seat 514, inner passage 426 and spring 520 cooperate to constitute a first check valve 524, which permits a flow of the fluid in a direction from the pump 150 toward the front wheel brake cylinder 22 when the pump side pressure is higher than the front cylinder side pressure by more than a preset valve opening pressure difference. The first check valve 430 inhibits a flow of the fluid in the reverse direction. The cup seal 516 and the outer passage 428 constitute a second check valve 526 which permits a flow of the fluid in the direction from the front wheel brake cylinder 22 toward the pump 150 and inhibits a flow of the fluid in the reverse direction.

The electrically conductive retainer 508 is connected to the detecting portion 442 by a wire 528 to the external detecting portion 442. The wire 528, conductive retainer 508, spring 520, valve member 522, valve seat member 504, a housing of the pressure reducing valve device 500, and the vehicle body are connected in series to each other so as to constitute an electric circuit which includes a stationary contact provided by the valve seat 514 and a movable contact provided by the valve member 522. The detecting portion 44 is adapted to detect a change of electrical continuity between the wire 258 and the vehicle body which functions as a ground, namely, between the valve member 522 and the valve seat 514, more specifically a chronological change in an electric current flowing between the valve member 522 and the valve seat 514. The controller 170 diagnose the pressure reducing valve device 500 on the basis of the output signal of the detecting portion 442.

Figure 21:
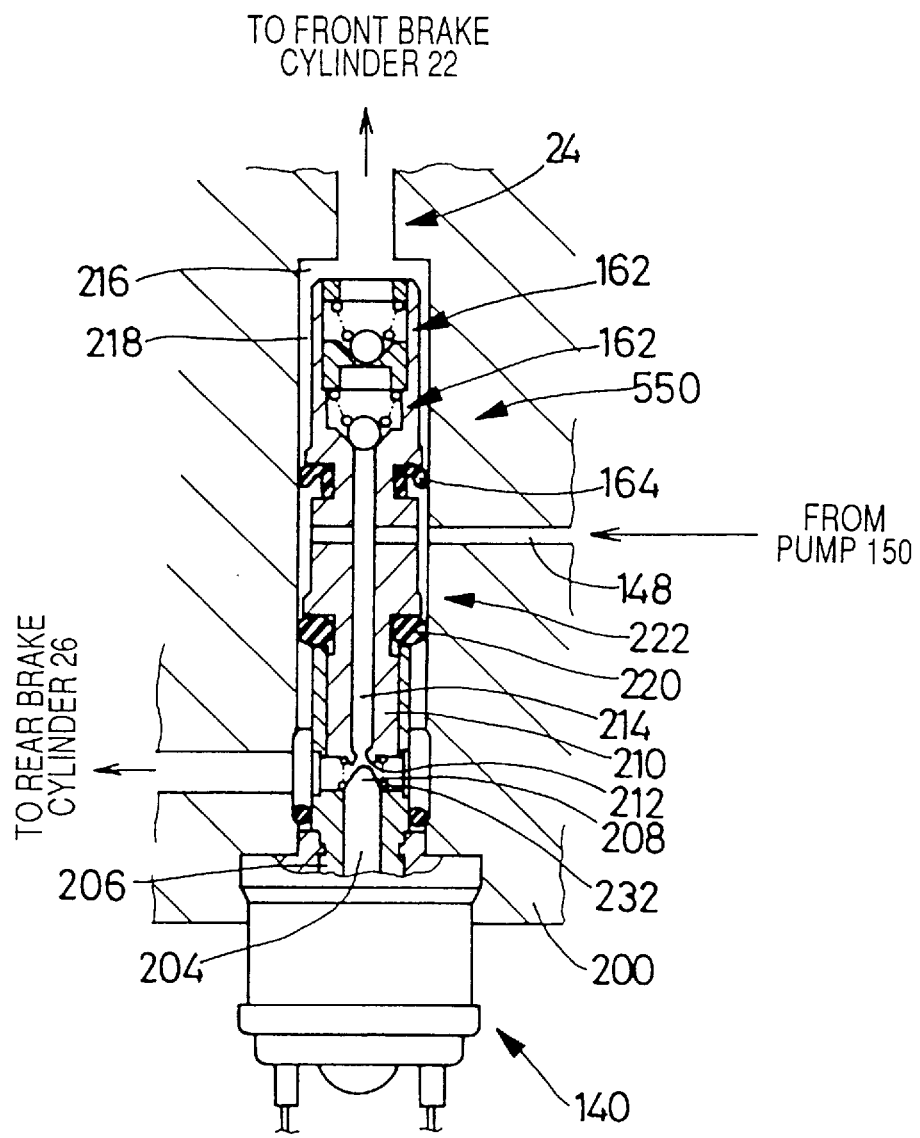
FIG. 21 is a front elevational view partly in cross section of a pressure reducing valve device and a second shut-off valve which are provided in an anti-lock braking system according to a sixth embodiment of the invention.

Referring next to FIG. 21, there will be described a sixth embodiment of the invention wherein the anti-lock braking system is different from the braking system of the first embodiment of FIG. 1, in that the braking system of FIG. 21 incorporates a pressure reducing valve device 550 different from the valve device 160 shown in FIG. 6. The braking system of FIG. 21 is also different from the braking system of the third embodiment of FIG. 14, in that the braking system of FIG. 21 does not use the differential pressure switch 300 and uses the valve device 550 in place the valve device 160. The braking system according to the sixth embodiment is not adapted to diagnose the valve device 550 for abnormality.

The pressure reducing valve device 550 includes two first check valves 162, 162 connected in series as shown in FIG. 21. Each of the first check valves 162 is provided with a biasing spring, the biasing force of which determines the opening pressure difference of each first check valve 162. In this respect, it is noted that the sum of the opening pressure differences of these two check valves 162 is a preset value which determines the pressure difference between the front and rear wheel brake cylinders 22, 26. In the present sixth embodiment, therefore, the rear wheel braking force is made larger than in the conventional brake system without any such check valves, unless the two check valves 162, 162 are simultaneously defective due to foreign matters caught therein. That is, the two first check valves 162, 162 which greatly influence the braking performance of the braking system are disposed in series connection with each other, so that the function of the pressure reducing valve 550 to reduce the pressure to be applied to the front wheel brake cylinder 22 with respect to the pressure to be applied to the rear wheel brake cylinder 26 would not be totally lost unless both of these two check valves 162 are unable to normally function in the presence of foreign matters caught in these two check valves 162. Thus, the use of the two first check valves 162 assures improved operating reliability of the braking system.

Generally, a relatively small opening pressure difference of a check valve results in an accordingly large lift of the check valve, that is, a relatively large maximum distance between the valve member and the valve seat of the check valve when the fluid flows through the check valve. The use of the two first check valves 162 in series connection with each other means a reduced opening pressure difference of each check valve 162, which results in an accordingly increased lift of each check valve, which in turn means reduced possibility of foreign matters being caught in the check valves. In this sense, too, the present embodiment is effective to improve the operating reliability of the braking system.

It will thus be understood that the use of the two first check valves 162 in series with each other provides not only an effect of reducing possibility of foreign matters being caught in the pressure reducing valve device 550, but also an effect of minimizing the deterioration of the function of the valve device 550 due to such foreign matters caught therein.

It is noted that the present technical concept of using a plurality of check valves in series connection with each other is applicable for purposes other than the optimization of distribution of the front and rear wheel braking forces of the vehicle, that is, applicable to a check valve device other than the pressure reducing valve devices (160, 400, 500, 550) provided in the embodiments described above. For instance, the concept is applicable to an anti-lock braking system of the type shown in FIG. 22, which will be briefly described.

Figure 22:
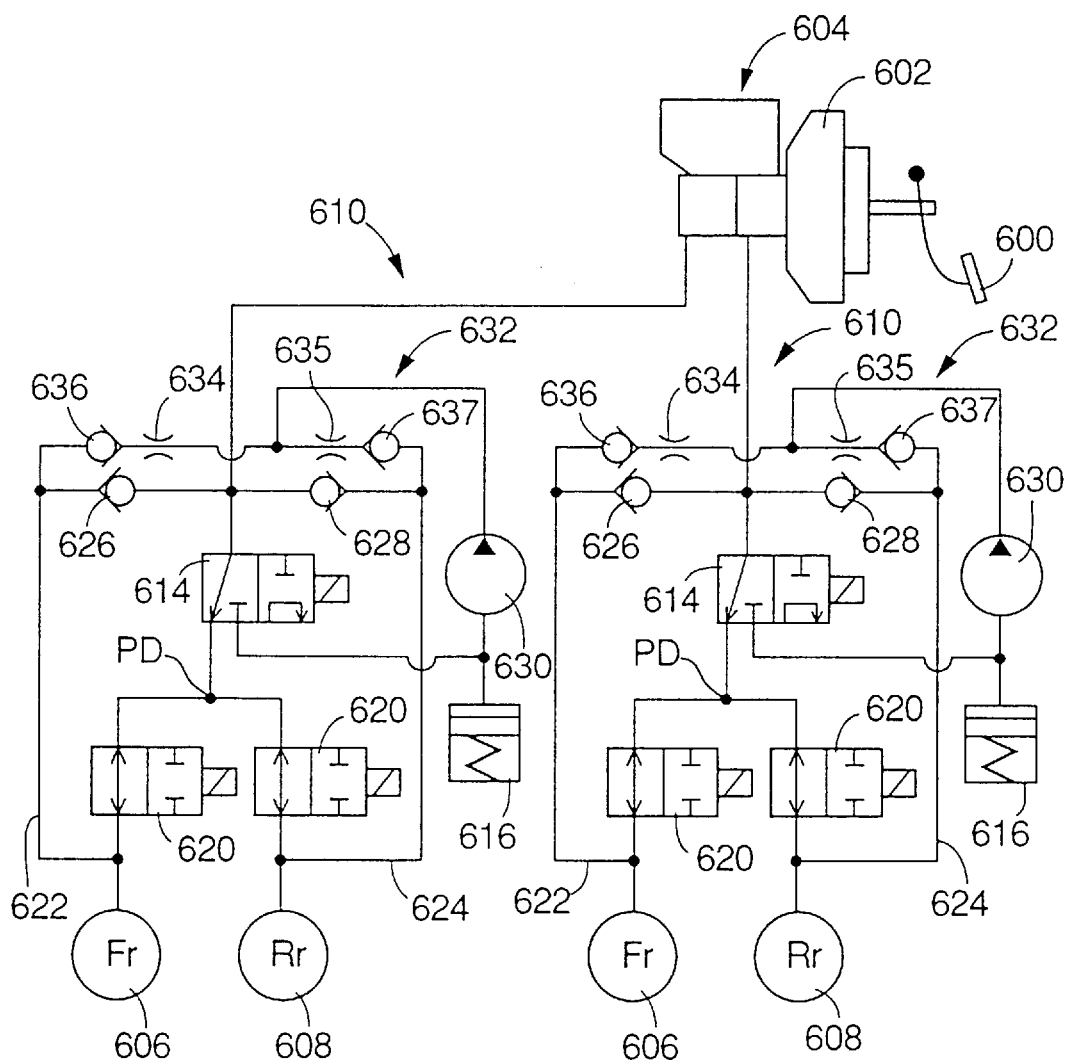
FIG. 22 is a schematic view showing an anti-lock braking system of a type different from that of FIGS. 1 and 14.

In the braking system of FIG. 22, a brake pedal 600 is operatively connected through a booster 602 to a tandem type master cylinder 604 which has two mutually independent pressurizing chambers. One of the chambers of the master cylinder 604 is connected to a front left wheel brake cylinder 606 and a rear right wheel brake cylinder 608, while the other chamber is connected to a front right wheel brake cylinder 606 and a rear left wheel brake cylinder 608. Thus, the braking system is a diagonal or X-crossing type having two mutually independent pressure application sub-systems each comprising one pressurizing chamber of the master cylinder 604 and the front and rear wheel brake cylinders 606, 608. One of these two sub-systems will be described in detail, since the two sub-systems are structurally identical with each other.

A primary fluid passage 610 is connected to the pressurizing chamber of the master cylinder 604. The primary fluid passage 610 is split at point PD into two branch lines connected to the front and rear wheel brake cylinders 606, 608. In a main portion of the primary fluid passage 610 between the master cylinder 604 and the point PD, there is provided a solenoid-operated directional control valve 614. This directional control valve 614 is normally placed in a master cylinder position in which the wheel brake cylinders 606, 608 are disconnected from a reservoir 616 and are connected to the master cylinder 604. When the solenoid of the directional control valve 614 is energized, the valve 614 is placed in a reservoir position in which the wheel brake cylinder 606, 608 are disconnected from the master cylinder 604 and are connected to the reservoir 616. A solenoid-operated shut-off valve 620 is provided in each of the two branch lines between the point PD of the primary fluid passage 610 and the wheel brake cylinders 606, 608. The shut-off valve 620 is normally placed in an open position in which the wheel brake cylinder 606, 608 is connected to the directional control valve 614. When the solenoid of the shut-off valve 620 is energized, the shut-off valve 620 is placed in a closed position in which the wheel brake cylinder 606, 608 is disconnected from the directional control valve 614.

In a normal braking operation of the braking system, the directional control valve 614 is placed in the master cylinder position while the shut-off valve 620 is placed in the open position, whereby the pressure generated in the appropriate pressurizing chamber of the master cylinder 604 is applied to the front and rear wheel brake cylinders 606, 608, for applying brake to the corresponding front and rear wheels of the vehicle.

In FIG. 22, reference numerals 622 and 624 denote return passages each of which has a check valve 626, 628 for preventing a flow of the fluid from the master cylinder 604 toward the wheel brake cylinder 606, 608.

When an anti-lock pressure control operation of the braking system is initiated, the solenoid of the directional control valve 614 is energized to disconnect the wheel brake cylinders 606, 608 from the master cylinder 604, and a pump 630 is used in place of the master cylinder 604 as a pressure source for operating the wheel brake cylinders 606, 608. In other words, the pressures in the wheel brake cylinders 606, 608 are increased by operation of the pump 630 during the anti-lock pressure control operation. To lower the pressures in the wheel brake cylinders 606, 608, the solenoids of the shut-off valves 620 are de-energized to permit the fluid to be discharged from the wheel brake cylinders 606, 608 into the reservoir 616 through the shut-off valves 620 and the directional control valve 620.

The fluid returned to the reservoir 616 is sucked up and pressurized by the pump 630, and the pressurized fluid is fed to the front wheel brake cylinder 606 and the rear wheel brake cylinder 608 through a pump passage 632. As in the preceding embodiments, the pressures in the wheel brake cylinders 606, 608 are increased by the pump 630 rather than the master cylinder 604, during the anti-lock pressure control operation. To this end, the front and rear wheel brake cylinders 606, 608 are connected to the pump 630 through the pump passage 632. The pump passage 632 has two branch lines connected to the respective cylinders 606, 608. A series connection of a flow restrictor 634 and a check valve 636 is provided in the branch line connected to the front wheel brake cylinder 606, while a series connection of a flow restrictor 635 and a check valve 637 is provided in the branch line connected to the rear wheel brake cylinder 608. The check valves 636, 637 permit flows of the fluid from the pump 630 toward the wheel brake cylinders 606, 608, but inhibits flows of the fluid in the reverse direction from the wheel brake cylinders 606, 608 toward the pump 630.

Figure 23:
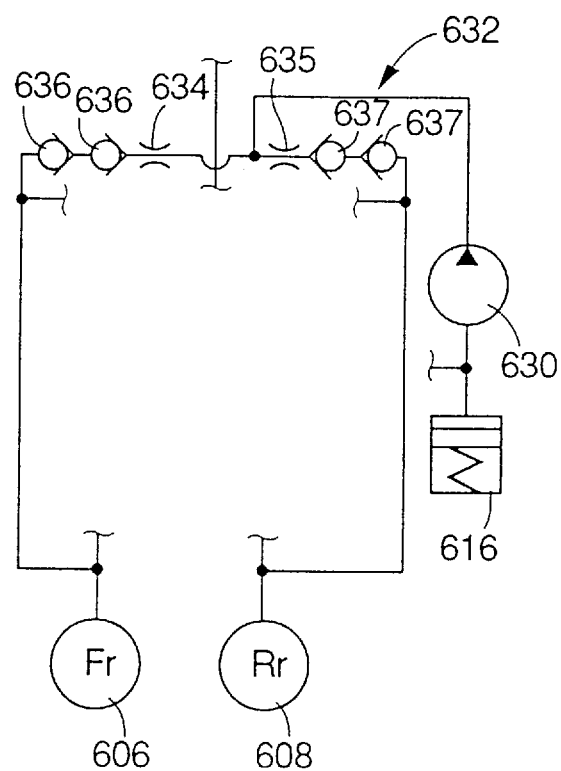
FIG. 23 is a view showing a series connection of two check valves used in the braking system of FIG. 21 according to a seventh embodiment of this invention.

In the event that a foreign matter is caught in the check valve 636, 637, the pressure in the wheel brake cylinder 606, 608 cannot be increased as needed by the pump 630 during the anti-lock pressure control operation. Thus, the check valves 636, 637 are important elements of the braking system which influence the braking performance, and therefore it is necessary to minimize the reduction of the braking performance of the braking system due to the malfunction of the check valves 636, 637 in the presence of foreign matters. In this sense, it is desirable to apply the above-indicated concept of using two check valves in series connection with each other, to the braking system of FIG. 22. For example, the braking system of FIG. 22 may be modified as indicated in FIG. 23, according to a seventh embodiment of this invention, wherein a series of two check valves 636, 636 is provided in series connection with the flow restrictor 634, while a series of two check valves 637, 373 is provided in series connection with the flow restrictor 635. According to this arrangement, it is possible to increase the pressures in the wheel brake cylinders 606, 608 by operation of the pump 630 during the anti-lock pressure control operation, unless the two check valves 636 or 637 are simultaneously defective.

It is noted that the technical concept of using a series of two or more check valves as in the embodiments of FIGS. 21 and 23 will inevitably increases a cost of manufacture of the braking system. If it is necessary to minimize an increase in the cost of the braking system due to the provision of some means for improving the operating reliability of the system, the above technical concept of using a series of check valves may be replaced by a technical concept of described below.

In the braking system of FIG. 23, the two check valves 636, 636 are used for the branch line of the pump passage 632 for the front wheel brake cylinder 606, while the two check valves 637, 373 are used for the branch line for the rear wheel brake cylinder 608. In the braking system of FIG. 22, only one check valve 636, 637 is used for each of the wheel brake cylinders 606, 608. In view of the relatively high cost of manufacture of the braking system of FIG. 23, the braking system of FIG. 22 may be arranged such that the check valves 636, 637 are opened when the pressure of the fluid delivered from the pump 630 is higher than the pressure in the wheel brake cylinder 606, 608 by more than a predetermined amount, namely, by more than a predetermined opening pressure difference which is considerably larger than zero. According to this arrangement or technical concept, where a foreign matter is caught in one of the check valves 636, 637, the abnormal check valve catching the foreign matter is kept open with the valve opening pressure difference being lowered to zero, while the predetermined valve opening pressure difference is required for the fluid to be able to flow through the other normally functioning check valve. In this case, therefore, the amount of flow of the fluid through the abnormal check valve is made larger than usual, resulting in an increased lift of the abnormal check valve, whereby the foreign matter is more likely to be removed by the flow of the fluid, than in the ordinary arrangement in which the opening pressure difference of the check valve is almost zero. Thus, the technical concept of FIG. 23 of using a series of two or more check valves for each of the front and rear wheel brake cylinders 606, 608 may be replaced by the technical concept of designing the check valves with a relatively large opening pressure difference. This latter technical concept assures improved operating reliability of the braking system while avoiding an increase in the cost of manufacture of the system due to the provision of additional check valves.

While the present invention has been described in detail in its presently preferred embodiments by reference to the accompanying drawings, it is to be understood that the invention is not limited to the details of the illustrated embodiments, but may be embodied with various changes, modifications and improvements, which may occur to those skilled in the art, without departing from the spirit and scope of the invention defined in the following claims.

What is claimed is:

1. The braking system for a motor vehicle, comprising:
   a pressure source;
   a front wheel brake cylinder and a rear wheel brake cylinder which are connected to said pressure source and produce respective front and rear braking forces for braking respective front and rear wheels of the vehicle;
   a pressure reducing valve device for reducing a pressure of said pressure source so that the reduced pressure is applied to said front wheel brake cylinder, the pressure of said pressure source being applied to said rear wheel brake cylinder without reduction by said pressure reducing valve device; and
   diagnosing means for detecting abnormality of said pressure reducing valve device, when the pressure applied to said front wheel brake cylinder is not reduced by said pressure reducing valve device.

2. A braking system according to claim 1, wherein said pressure reducing valve device includes a check valve which permits a flow of a brake fluid in a first direction from said pressure source toward said front wheel brake cylinder when a pressure of said pressure source is higher than a pressure in said front wheel brake cylinder by more than a predetermined valve opening pressure difference, said check valve inhibiting a flow of the brake fluid in a second direction opposite to said first direction.

3. A braking system according to claim 1, which is an X-crossing type braking system for a four-wheel motor vehicle including said front and rear wheels, said X-crossing type braking system having two pressure application sub-systems which are connected to respective two mutually independent pressurizing chambers of a master cylinder, each of said two pressure application sub-systems including (a) a front brake cylinder passage connecting a corresponding one of the two pressurizing chambers of the master cylinder and said front wheel brake cylinder, (b) a rear brake cylinder passage connecting said front brake cylinder passage and said rear wheel brake cylinder, (c) a first shut-off valve which is disposed in a portion of said front brake cylinder passage between said master cylinder and a point of connection of said front and rear brake cylinder passages, said first shut-off valve being open and closed respectively in a normal braking mode and an anti-lock braking mode of said front and rear wheel brake cylinders, (d) a normally-open second shut-off valve disposed in the rear brake cylinder passage, (e) a reservoir passage connected at one of opposite ends thereof to a portion of said rear brake cylinder passage between said second shut-off valve and said rear wheel brake cylinder, (f) a normally-closed third shut-off valve disposed in the reservoir passage, (g) a reservoir connected to the other end of said reservoir passage, (h) a pump passage connected at one of opposite ends thereof to said reservoir and at the other end thereof to at least one of a portion of the rear brake cylinder passage between the second shut-off valve and said point of connection and a portion of said front brake cylinder passage between said first shut-off valve and said front wheel brake cylinder, (i) a pump disposed in said pump passage for pressurizing a brake fluid received from said reservoir and delivering the pressurized brake fluid to a portion of each pressure application sub-system, and (j) a controller for controlling said first, second and third shut-off valves for controlling pressures in said front and rear wheel brake cylinders in said anti-lock braking mode, and wherein said pressure reducing valve device is disposed between said pump and said front wheel brake cylinder for reducing a pressure of said pressurized brake fluid so that the reduced pressure of the pressurized brake fluid is applied to said front wheel brake cylinder.

4. A braking system according to claim 1, which is an X-crossing type braking system for a four-wheel motor vehicle including said front and rear wheels, said X-crossing type braking system having two pressure application sub-systems which are connected to respective two mutually independent pressurizing chambers of a master cylinder, each of said two pressure application sub-systems including (a) a front brake cylinder passage connecting a corresponding one of the two pressurizing chambers of the master cylinder and said front wheel brake cylinder, (b) a rear brake cylinder passage connecting said front brake cylinder passage and said rear wheel brake cylinder, (c) a first shut-off valve which is disposed in a portion of said front brake cylinder passage between said master cylinder and a point of connection of said front and rear brake cylinder passages, said first shut-off valve being open and closed respectively in a normal braking mode and an anti-lock braking mode of said front and rear wheel brake cylinders, (d) a normally-open second shut-off valve disposed in the rear brake cylinder passage, (e) a reservoir passage connected at one of opposite ends thereof to a portion of said rear brake cylinder passage between said second shut-off valve and said rear wheel brake cylinder, (f) a normally-closed third shut-off valve disposed in the reservoir passage, (g) a reservoir connected to the other end of said reservoir passage, (h) a pump passage connected at one of opposite ends thereof to said reservoir and at the other end thereof to at least one of a portion of the rear brake cylinder passage between the second shut-off valve and said point of connection and a portion of said front brake cylinder passage between said first shut-off valve and said front wheel brake cylinder, (i) a pump disposed in said pump passage for pressurizing a brake fluid received from said reservoir and delivering the pressurized brake fluid to a portion of each pressure application sub-system, and (j) a controller for controlling the first, second and third shut-off valves for controlling pressures in said front and rear wheel brake cylinders in said anti-lock braking mode, and wherein said pressure reducing valve device is disposed between said pump and said front wheel brake cylinder for reducing a pressure of said pressurized brake fluid so that the reduced pressure of the pressurized brake fluid is applied to said front wheel brake cylinder, and wherein said diagnosing means determines, for at least one of said two pressure application sub-systems, the presence or absence of abnormality of said pressure reducing valve device, on the basis of the number of operations to reduce the pressure in said rear wheel brake cylinder in said anti-lock braking mode.

5. A braking system according to claim 4, wherein said diagnosing means in said each pressure application sub-system determines the presence of an abnormal state of the braking system if a predetermined abnormality condition is satisfied, said predetermined abnormality condition consisting of at least one of a first and second condition, said abnormal state being defined as a state in which both of the pressure reducing valve devices in said two pressure application sub-systems are not normally functioning, said first condition being a condition that a ratio of the number of the operations to reduce the pressure in said rear wheel brake cylinder in said anti-lock braking mode to the number of operations to reduce the pressure in said front wheel brake cylinder in said anti-locking braking mode is equal to a predetermined reference valve or smaller, and said second condition being a condition that a difference obtained by subtracting said number of the operations to reduce the pressure in said front wheel brake cylinder from said number of the operations to reduce the pressure in said rear wheel brake cylinder is equal to a predetermined reference value or smaller.

6. A braking system according to claim 5, wherein said diagnosing means determines the presence of said abnormal state of the braking system if said predetermined abnormality condition is satisfied consecutively at least a predetermined number of times in either one of said two pressure application sub-systems.

7. A braking system according to claim 5, wherein said diagnosing means determines the presence of said abnormal state of the braking system if said predetermined abnormality condition is satisfied consecutively at least a predetermined number of times in both of said two pressure application sub-systems.

8. A braking system according to claim 5, wherein said diagnosing means determines the presence of said abnormal state of the braking system if said predetermined abnormality condition is satisfied consecutively at least a predetermined first number of times in either one of said two pressure application sub-systems, or if said predetermined abnormality condition is satisfied consecutively at least a predetermined second number of times in both of said two pressure application sub-systems, said predetermined second number being smaller than said predetermined first number.

9. A braking system according to claim 4, further comprising enabling means connected to said diagnosing means, for enabling said diagnosing means to operate when a load acting on the motor vehicle is smaller than a predetermined threshold.

10. A braking system according to claim 4, further comprising enabling means connected to said diagnosing means, for enabling said diagnosing means to operate when a value of deceleration of the motor vehicle is smaller than a predetermined threshold.

11. A braking system according to claim 4, further comprising enabling means connected to said diagnosing means, for enabling said diagnosing means to operate when a load acting on the motor vehicle is smaller than a predetermined first threshold and when a value of deceleration of the motor vehicle is smaller than a predetermined second threshold.

12. A braking system according to claim 4, further comprising enabling means connected to said diagnosing means, for enabling said diagnosing means to operate when a value of deceleration of the motor vehicle is smaller than a predetermined threshold and when the motor vehicle is running straight on a road surface whose friction coefficient is substantially equal in right and left areas thereof which correspond to said front and left wheels, respectively.

13. A braking system according to claim 1, further comprising enabling means connected to said diagnosing means, for enabling said diagnosing means to operate when a load acting on the motor vehicle is smaller than a predetermined threshold and when the motor vehicle is running straight on a road surface whose friction coefficient is substantially equal in right and left areas thereof which correspond to said front and left wheels, respectively.

14. A braking system according to claim 1, further comprising a solenoid-operated valve device for controlling pressures in said front and rear wheel brake cylinders, and a controller for controlling said solenoid-operated valve device for controlling the pressures in said front and rear wheel brake cylinders, and wherein said diagnosing means includes means for detecting the abnormality of said pressure reducing valve device, on the basis of the number of operations to reduce the pressure in at least one of said front and rear wheel brake cylinders in an anti-lock braking mode.

* * * * *

UNITED STATES PATENT AND TRADEMARK OFFICE
CERTIFICATE OF CORRECTION

Page 1 of 2

PATENT NO. : 5,810,455
DATED : September 22, 1998
INVENTOR(S) : Noboru Noguchi

It is certified that error appears in the above-indentified patent and that said Letters Patent is hereby corrected as shown below:

| Column | Line | |
|---|---|---|
| 3 | 31 | Delete "LO". |
| 4 | 21 | Change "a fact" to --the fact--. |
| 5 | 17 | Change "member" to --members--. |
| 10 | 9 | Change "where" to --when--. |
| 29 | 44 | Change "senor" to --sensor--. |
| 33 | 11 | Change "it solenoid" to --its solenoid--. |
| 37 | 64 | Change "brake" to --brakes--. |
| 38 | 61 | Change "increases" to --increase--. |
| 38 | 66 | After "concept" change "of" to --as--. |
| 39 | 4 | Change "637, 373" to --637, 637--. |
| 42 | 32 | Change "claim 4" to --claim 1--. |

UNITED STATES PATENT AND TRADEMARK OFFICE
CERTIFICATE OF CORRECTION

PATENT NO.  : 5,810,455
DATED       : September 22, 1998
INVENTOR(S) : Noboru Noguchi It is certified that error appears in the above-indentified patent and that said Letters Patent is hereby corrected as shown below:

| Column | Line | |
|---|---|---|
| 42 | 34 | Delete "value". |

Signed and Sealed this

Sixteenth Day of November, 1999

Attest:

Q. TODD DICKINSON

*Attesting Officer*          *Acting Commissioner of Patents and Trademarks*